Dec. 14, 1965   C. I. WILLIAMS   3,223,825
ELECTRIC GRID FLOOR HEATING SYSTEM
Filed March 21, 1958   16 Sheets-Sheet 2
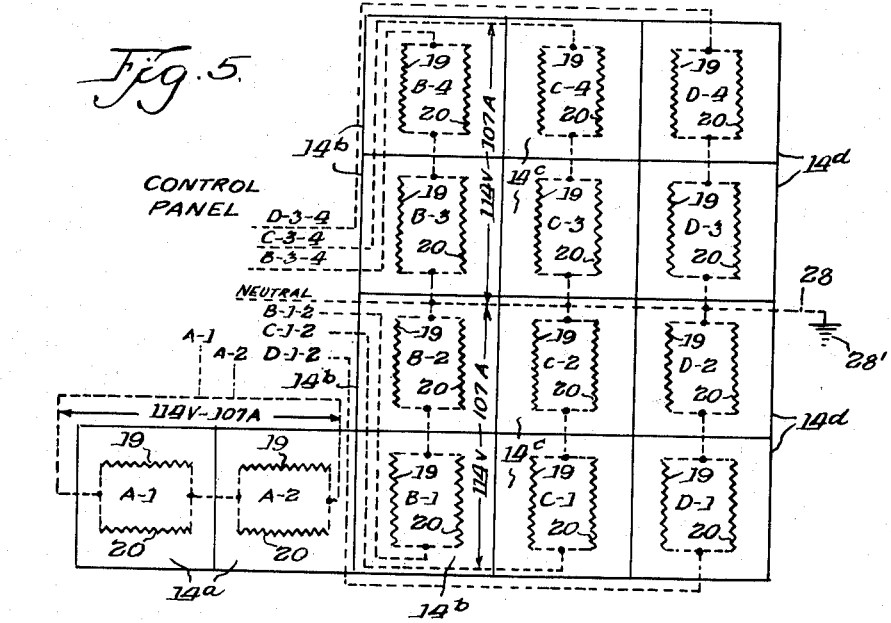
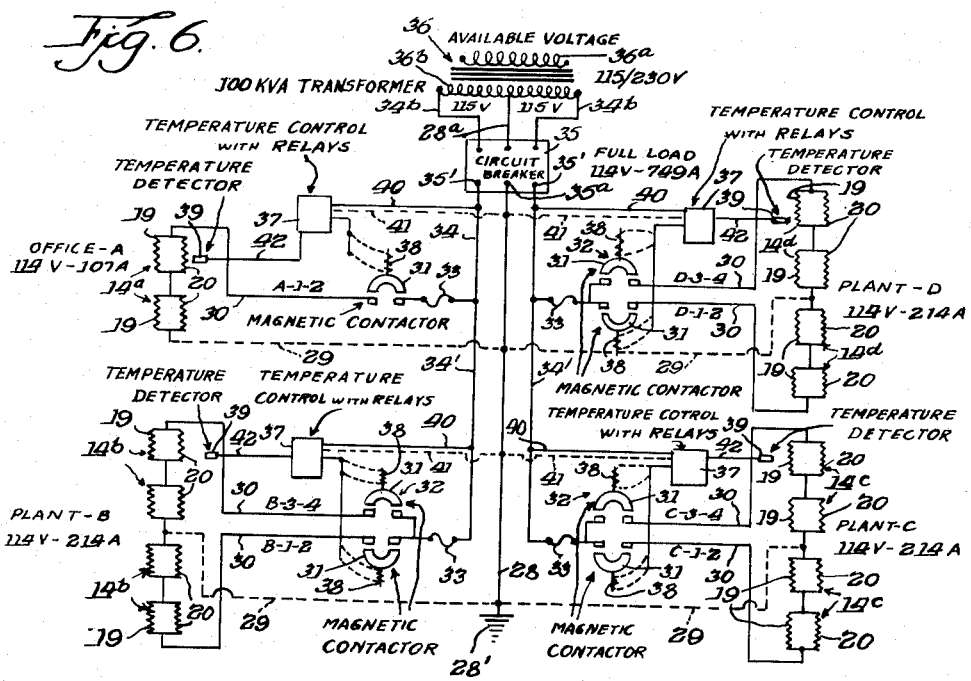

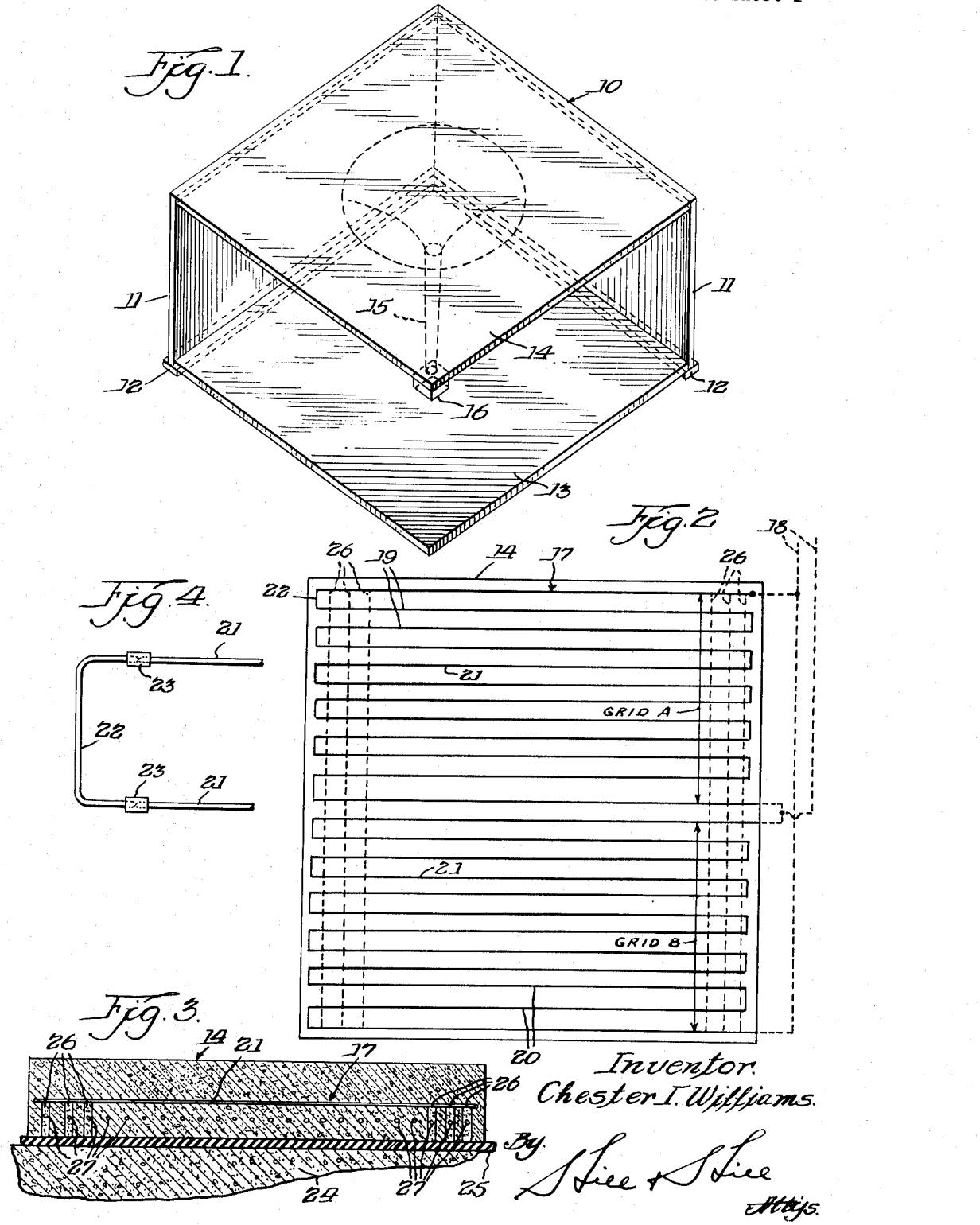

Dec. 14, 1965
C. I. WILLIAMS
3,223,825
ELECTRIC GRID FLOOR HEATING SYSTEM
Filed March 21, 1958
16 Sheets-Sheet 3
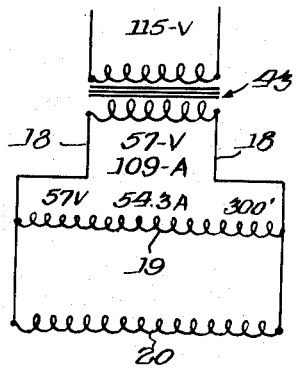
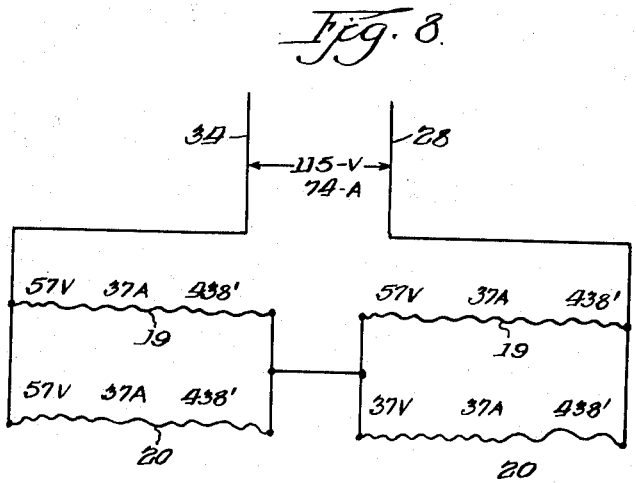
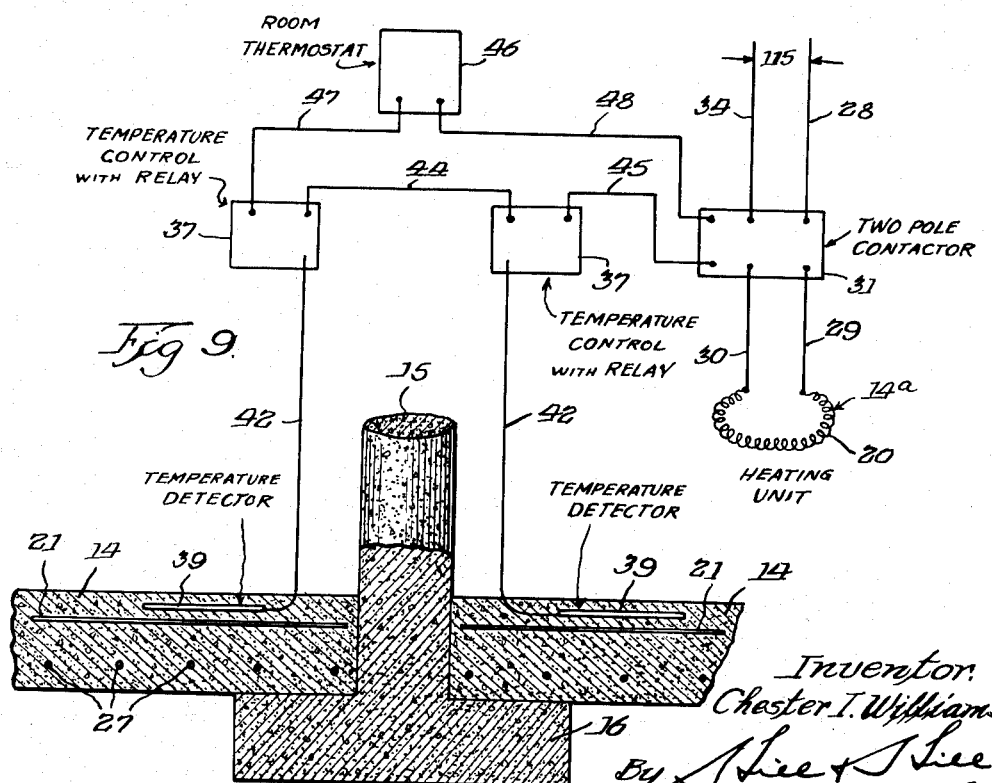

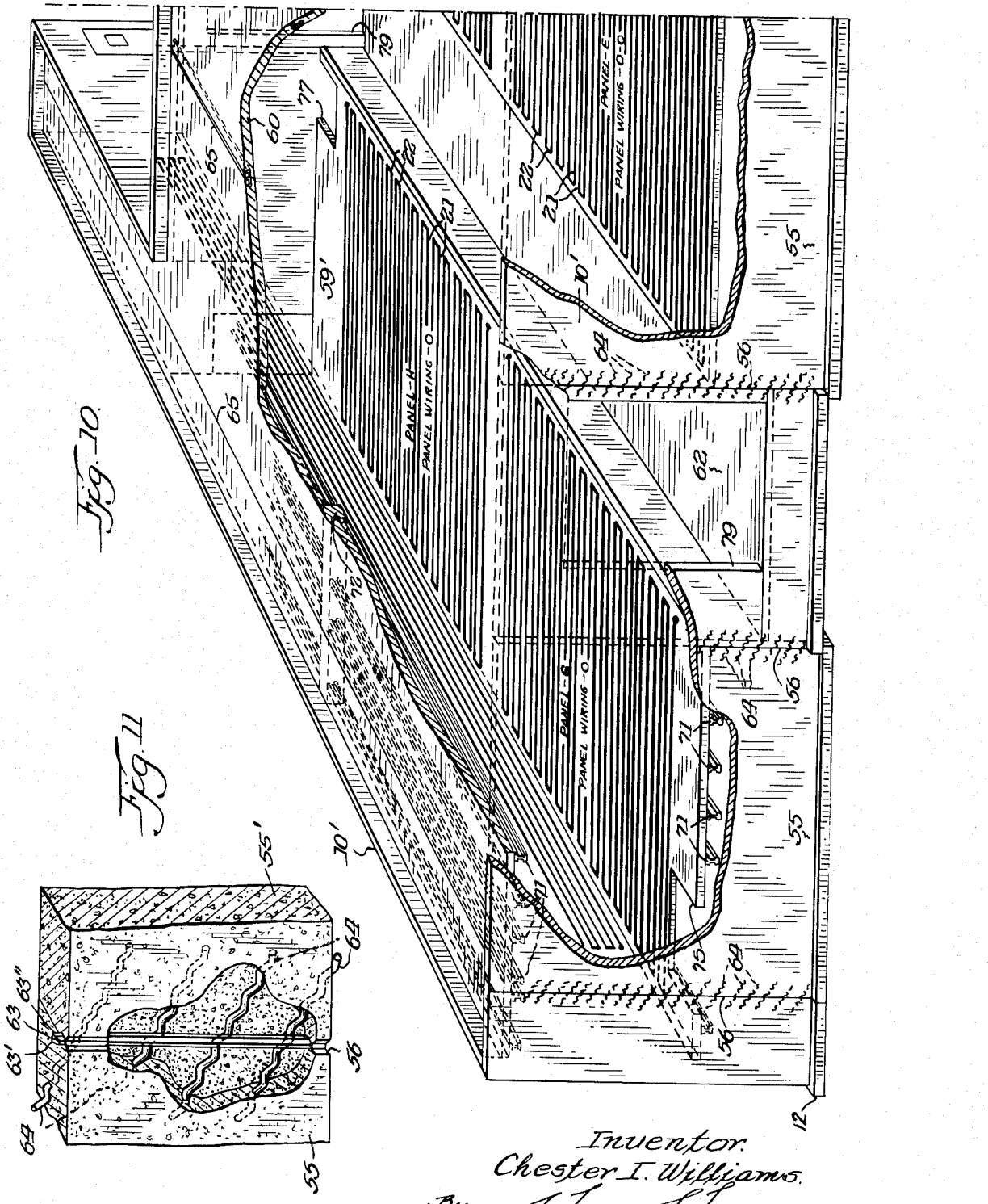

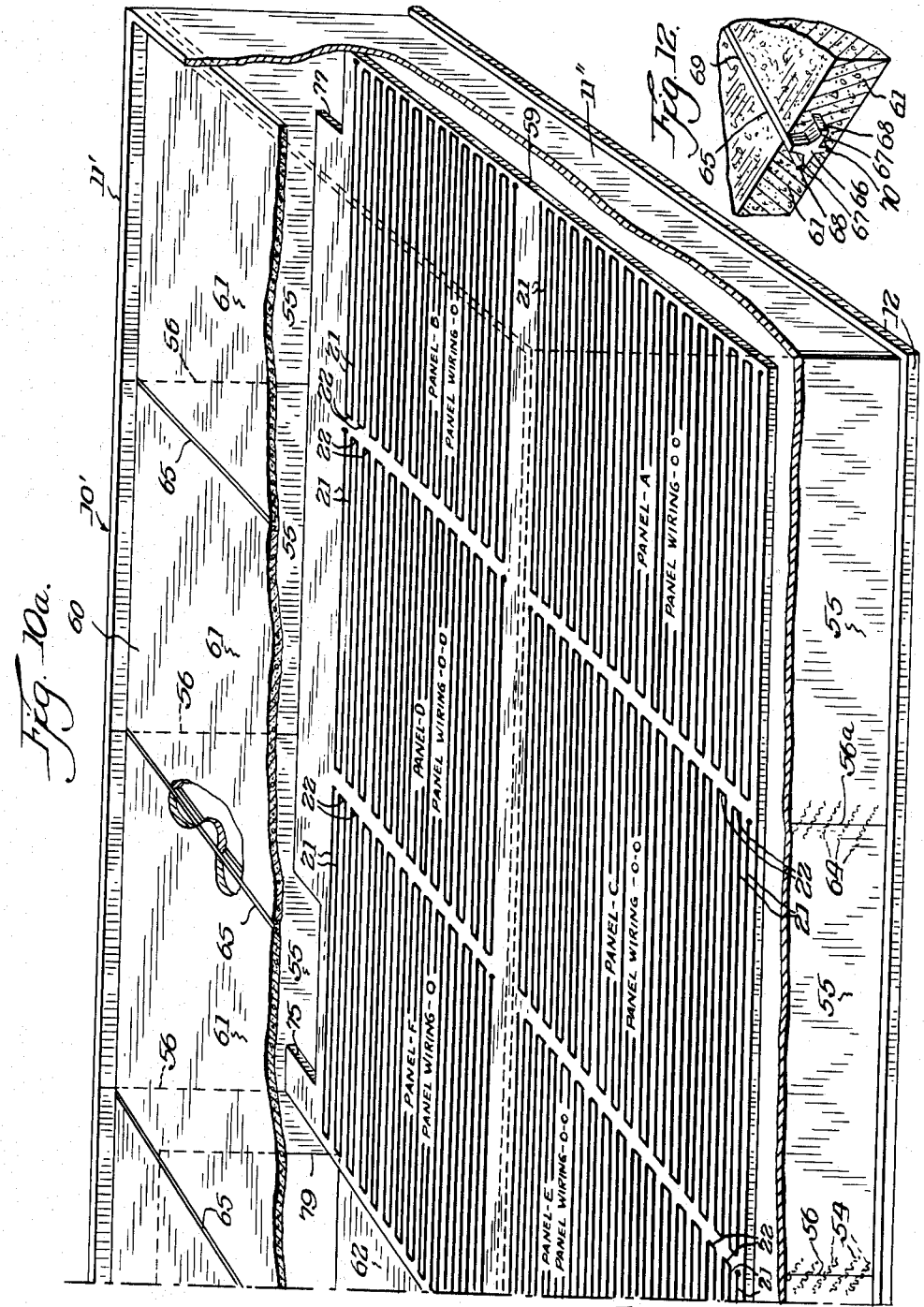

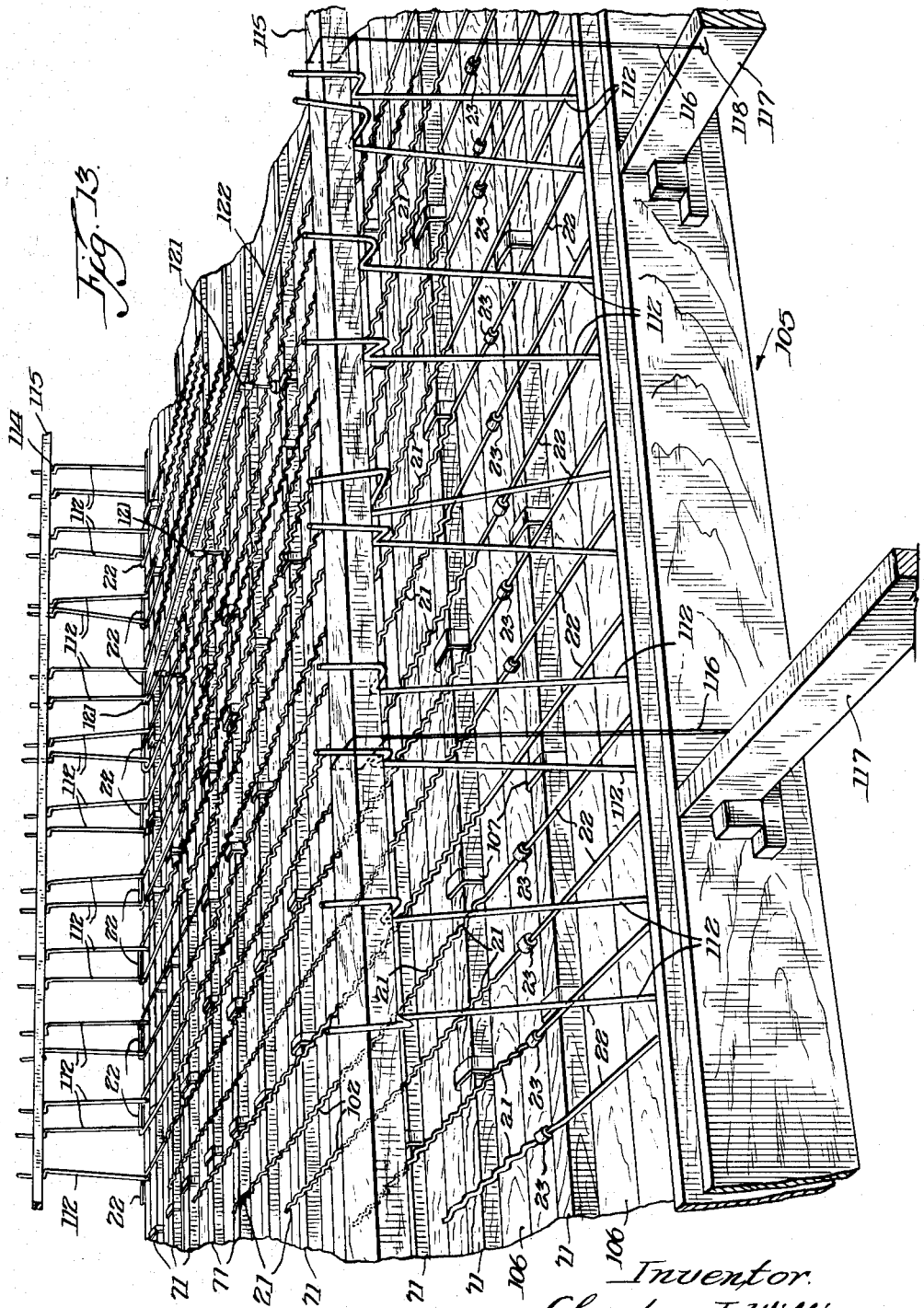

Dec. 14, 1965 C. I. WILLIAMS 3,223,825
ELECTRIC GRID FLOOR HEATING SYSTEM
Filed March 21, 1958 16 Sheets-Sheet 7
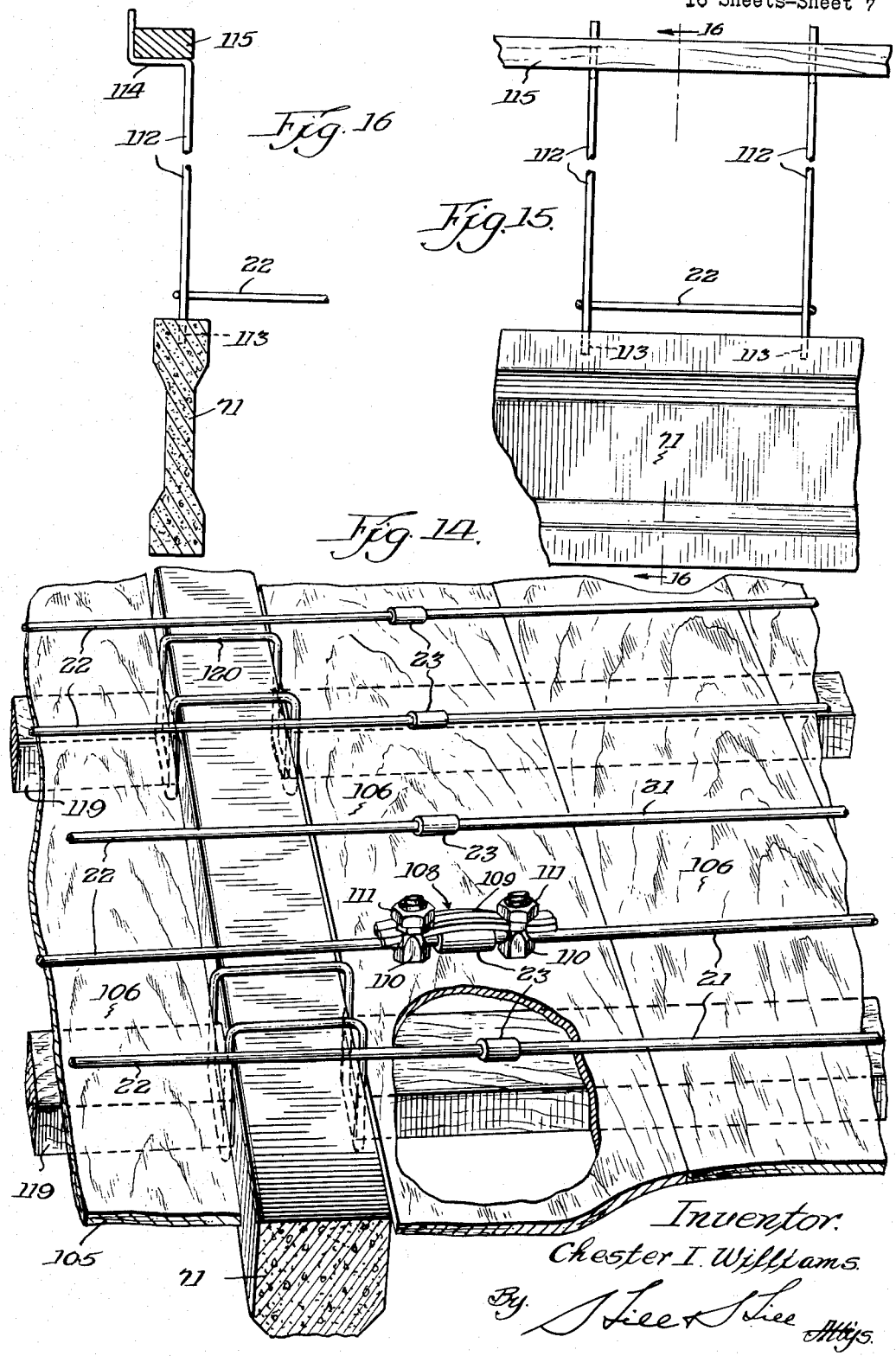
Inventor:
Chester I. Williams
By
Attys.

Dec. 14, 1965     C. I. WILLIAMS     3,223,825
ELECTRIC GRID FLOOR HEATING SYSTEM
Filed March 21, 1958     16 Sheets-Sheet 8
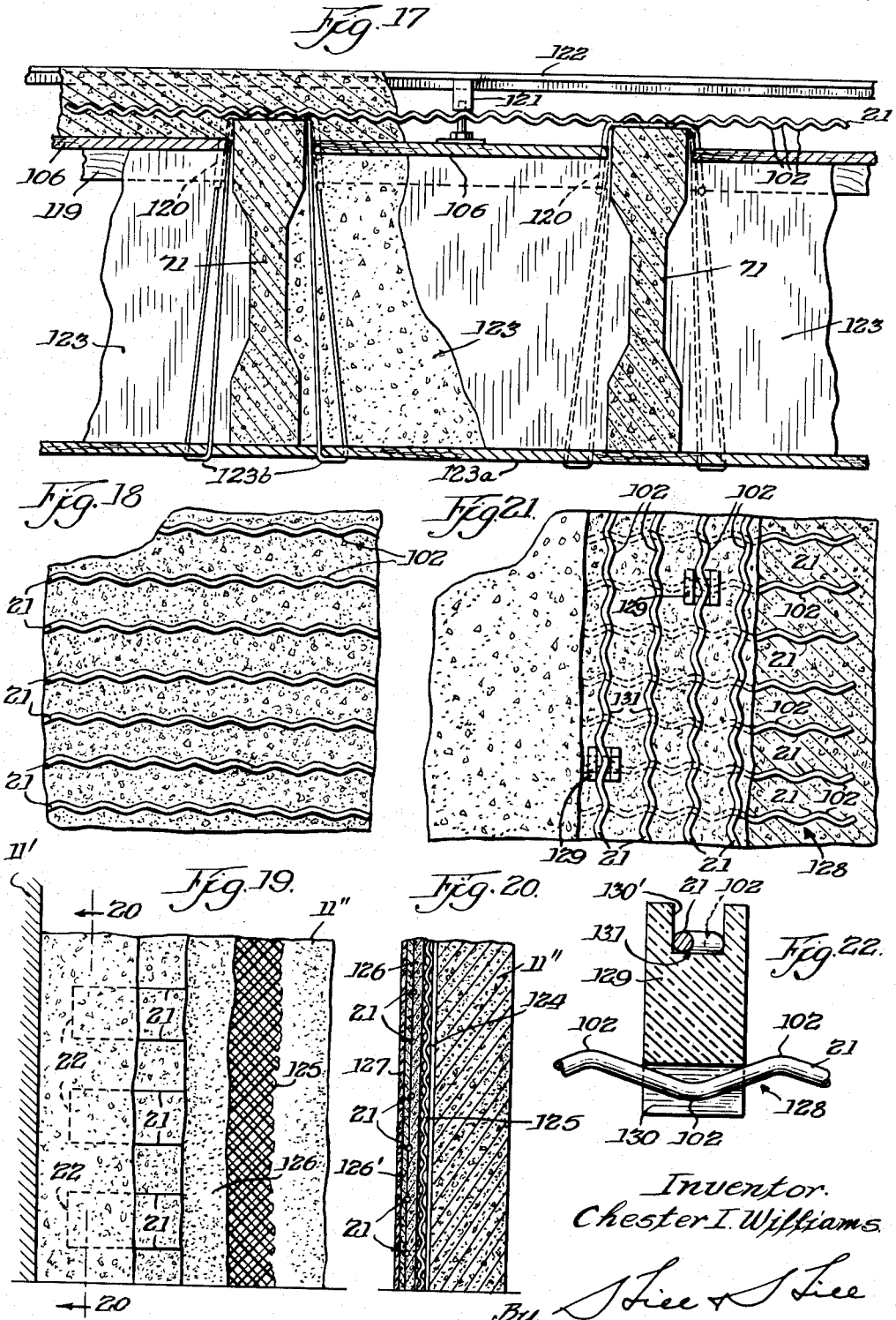

Dec. 14, 1965   C. I. WILLIAMS   3,223,825
ELECTRIC GRID FLOOR HEATING SYSTEM
Filed March 21, 1958   16 Sheets-Sheet 9
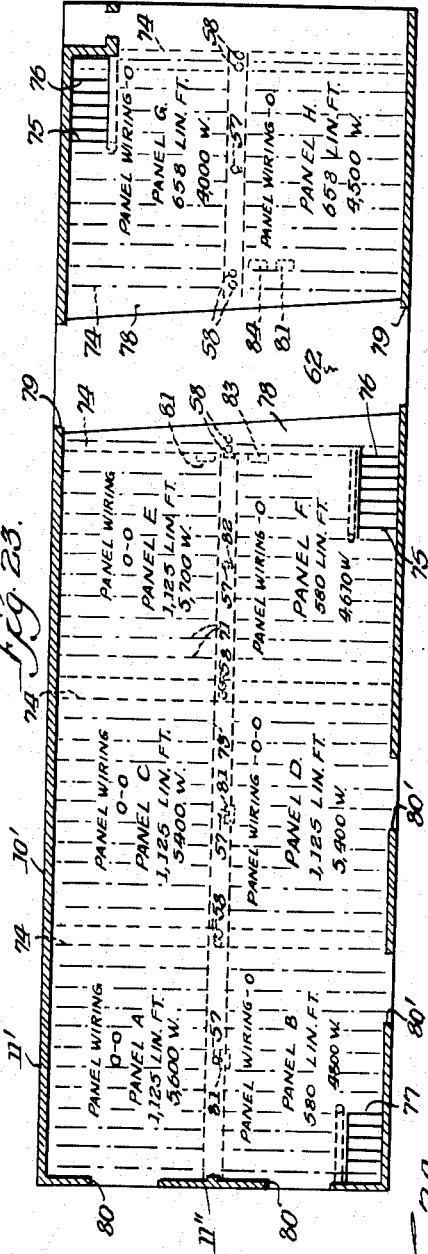
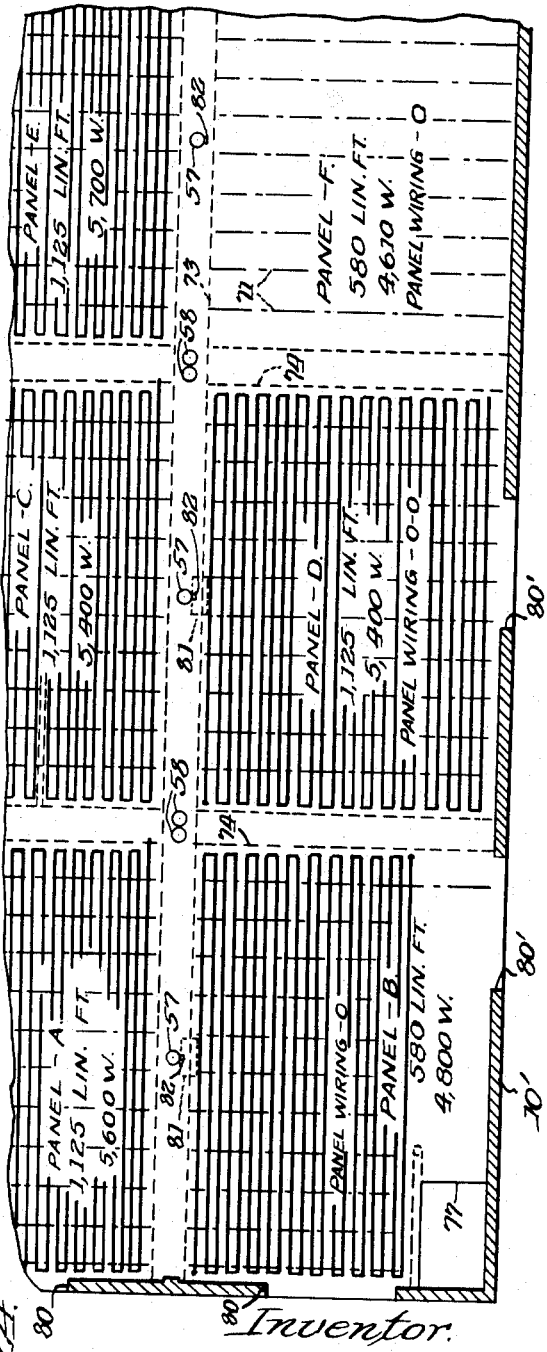
Inventor.
Chester I. Williams

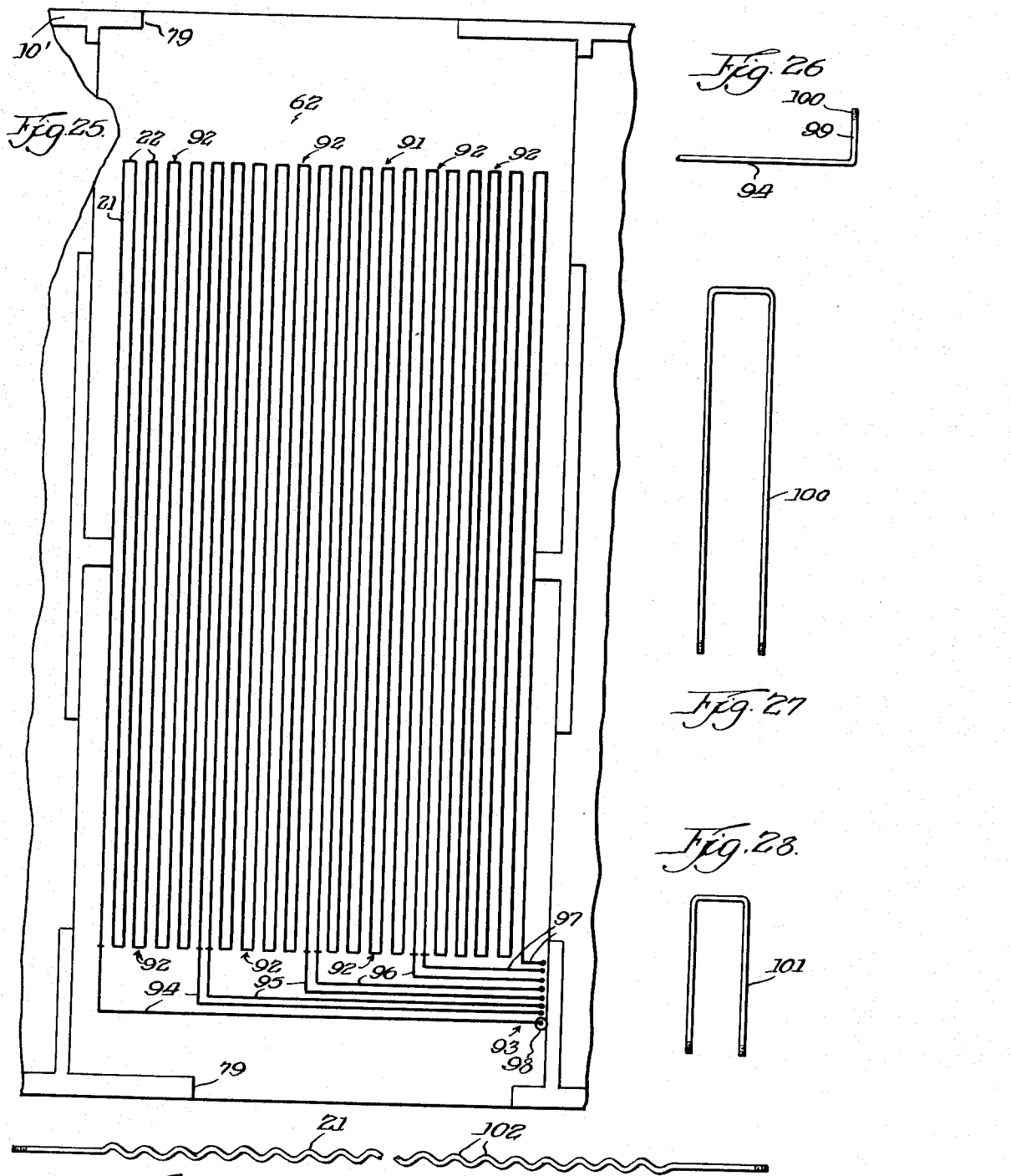

Dec. 14, 1965   C. I. WILLIAMS   3,223,825
ELECTRIC GRID FLOOR HEATING SYSTEM
Filed March 21, 1958   16 Sheets-Sheet 11
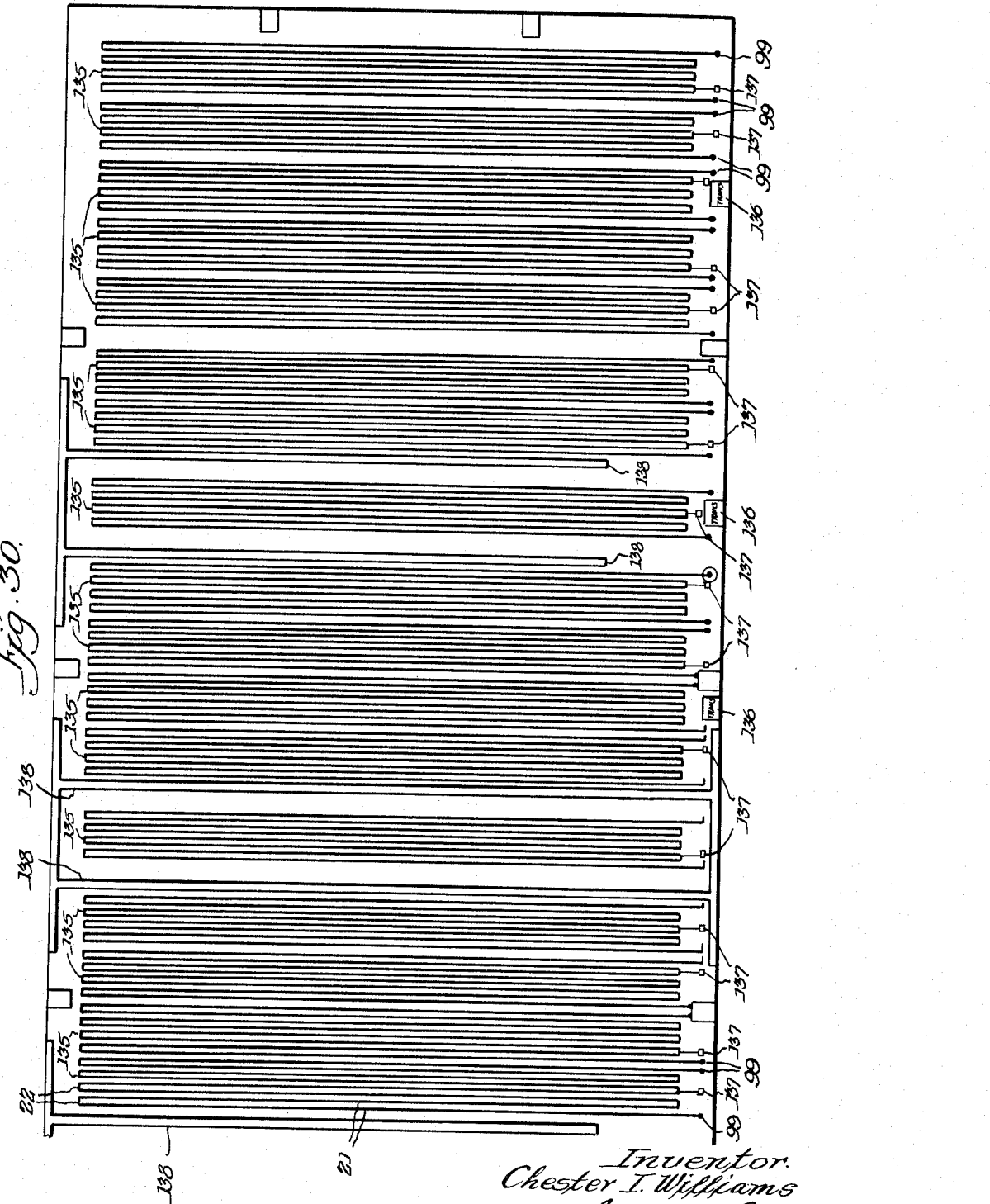

Dec. 14, 1965  C. I. WILLIAMS  3,223,825
ELECTRIC GRID FLOOR HEATING SYSTEM
Filed March 21, 1958  16 Sheets-Sheet 12

Inventor.
Chester I. Williams,
By Lee & Lee
Attys.

Dec. 14, 1965  C. I. WILLIAMS  3,223,825
ELECTRIC GRID FLOOR HEATING SYSTEM
Filed March 21, 1958  16 Sheets-Sheet 13
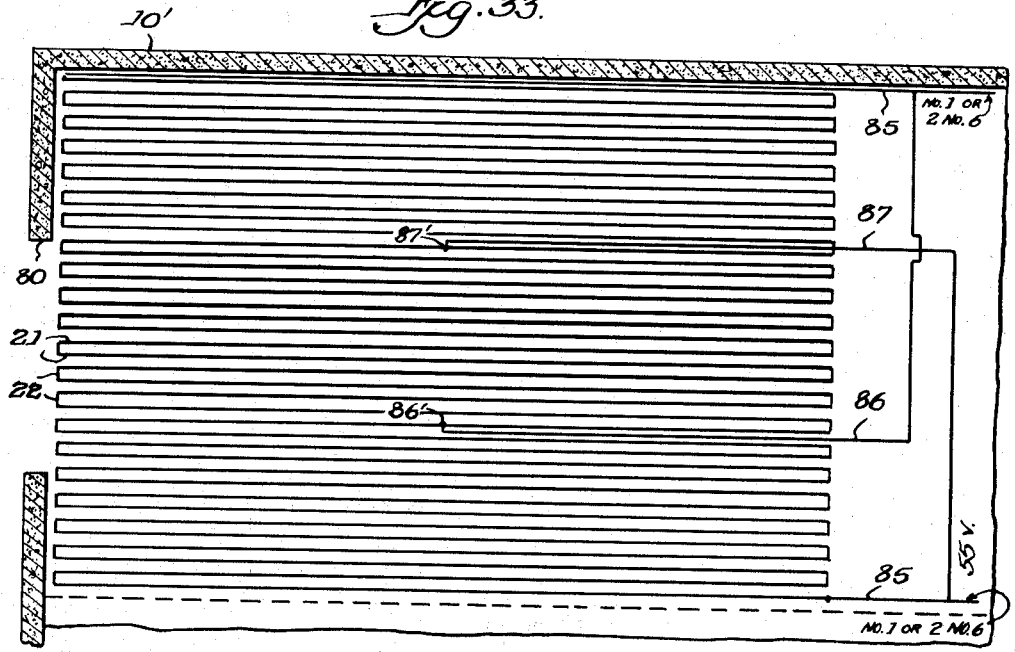
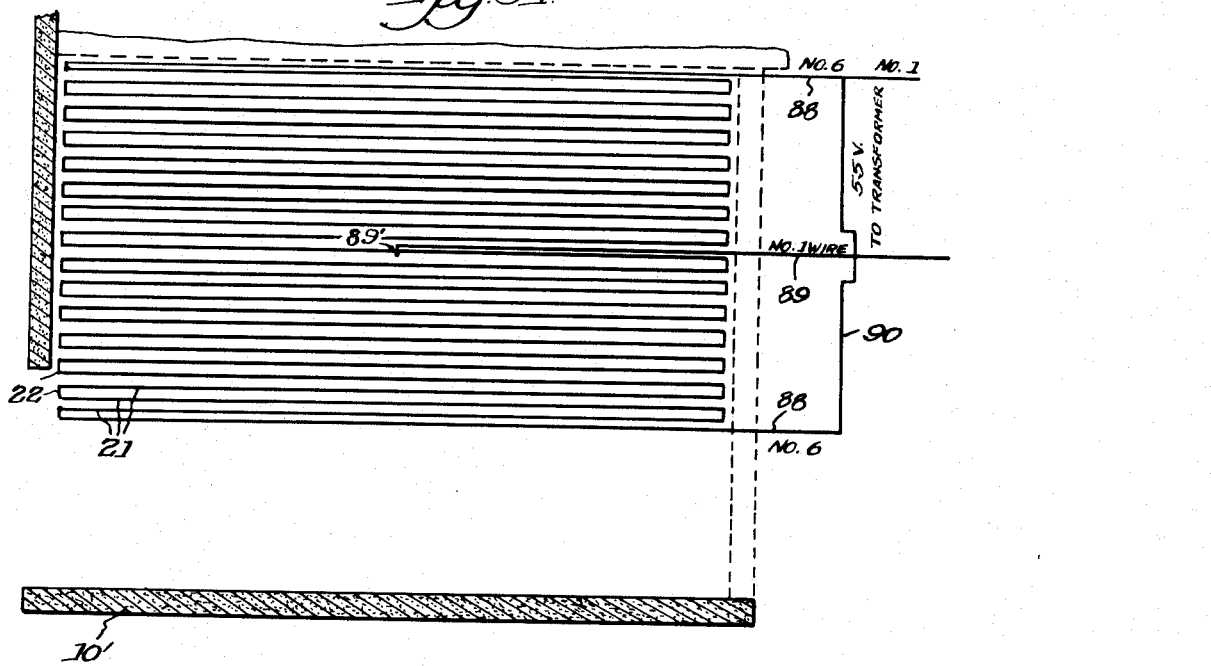
Inventor.
Chester I. Williams,
By Lee & Lee
Attys.

Inventor.
Chester I. Williams.

Dec. 14, 1965  C. I. WILLIAMS  3,223,825
ELECTRIC GRID FLOOR HEATING SYSTEM
Filed March 21, 1958  16 Sheets-Sheet 15

Inventor.
Chester I. Williams.
By  J Lee & J Lee
Attys.

Dec. 14, 1965  C. I. WILLIAMS  3,223,825
ELECTRIC GRID FLOOR HEATING SYSTEM
Filed March 21, 1958  16 Sheets-Sheet 16

Inventor.
Chester I. Williams
By
Attys.

United States Patent Office 3,223,825
Patented Dec. 14, 1965

3,223,825
ELECTRIC GRID FLOOR HEATING SYSTEM
Chester I. Williams, 1501 Madison Ave. SE.,
Grand Rapids 7, Mich.
Filed Mar. 21, 1958, Ser. No. 722,971
3 Claims. (Cl. 219—213)

This invention relates to improvements in a heating system and more particularly to floors of a building construction where such floors are of reinforced concrete, and the heating system is also adapted for wall constructions of buildings whether monolithic, concrete or plaster.

Prior to my invention, a patent to R. S. Tice, No. 2,503,601 granted Apr. 11, 1950 for an Electric Floor Heating System disclosed and claimed an electric floor heating system in which was employed an iron cable that was particularly suited for buildings with wooden floors.

Another patent to R. B. Sutter, No. 2,138,217 granted Nov. 29, 1938 also related to an Electrical Heating System which distributed heat to the occupants by each of the three methods by which heat is transferred, namely, radiation, conduction and convection; and in which a heat radiating structural floor slab or wall panel was utilized comprising in unified construction a sublayer which included granulated cork and an oxichloride cement, a wearing surface layer which included silica, metal filings or shavings and an oxichloride cement and an electrical resistor embedded therein in a plane substantially parallel to the wearing surface.

A still earlier patent to S. A. Williams et al., No. 2,018,293 granted Oct. 22, 1935 for an Electrical Heating System disclosed and claimed an electrical heating system for heating buildings by an electrically generated heat radiating system from the walls, floors, ceilings or other suitable structural part of the walls or buildings, and referred to that system in which the conductor wires are threaded to beads or short tubes of glass, porcelain or other insulating material and then enclosed in metallic or other tubes before being disposed in or incorporated with the floors or walls of the room or building, the length of said metallic tubes depending upon the surface area of the structure from which the heat radiates. The patent to L. P. Hynes, No. 1,742,159 granted Dec. 31, 1929 for an Electric Heating System in which the heating was preferably produced by separable heating coils which might be introduced into or withdrawn from ducts which might be formed in the cement of the flooring, or might be formed of metal tubes rolled down to a reduced size with the surplus metal spread out as side ribs on the tubes at diametrically opposite points thereof. The concrete flooring of this invention has embedded therein a convolute metal stiffener which may be in the form of a corrugated sheet or a corrugated wire netting, and the ducts for the heating coils are positioned in the folds of the stiffener structure. The patent to W. W. Lillard, No. 1,349,136 granted Aug. 10, 1920 relates to a Heating Means and particularly relates to a new and improved heating means for heating monolithic structures thus rendering it serviceable for heating street gutters and sidewalks to melt the snow swept into the gutter or lying on the sidewalk, and the heating means is also serviceable for heating monolithic floors of factories, schools and other buildings thus dispensing with radiators. The heating means of this invention includes a tube provided with an interior lining of mica or similar non-conducting material and within the tube is arranged an electric heating coil of German silver or similar material capable of resisting an electric current. In conjunction with the electric heating coil there is utilized a heat distributing medium preferably in the form of a wire netting resting on metallic bars embedded in the monolithic structure, and the bars are provided at their middle with an offset saddle seated on the metallic tube in which is arranged the electric heating coil.

A British patent to Fernand Andre Louis Billerey, No. 309,093 accepted Apr. 5, 1929 for improvements in and relating to Electric Heating disclosed a method of and apparatus for electric heating wherein a permanent or semi-permanent tube (or tubes) of glass or other insulating material is embedded or enclosed in, and is in continuous integral heat-conducting relation to the heat-radiating mass of plaster or like moulding material constituting the panel, slab, strip or the like, such insulating tube being protected by a shield which may be of tubular form, also embedded or enclosed in the heat-radiating mass, while the heat-emitting resistances are insertable into or withdrawals from said insulating tube in an endwise direction as required for inspection, renewal or the like.

It is therefore a principal object of the invention to provide an improved electric grid floor heating system and controls therefor, for a reinforced monolithic concrete building construction to overcome the objections of the prior art as outlined above, and wherein the reinforcing for the monolithic concrete floor and/or wall construction of the building provides the current-carrying means of the improved electric grid floor heating system.

Another object of the invention is to provide a safe, efficient and noiseless technical heating system that is particularly suited for reinforced monolithic floor constructions, driveways within buildings, outdoor loading platforms, reinforced sidewalks and roadways, wherein the reinforcing rods for the concrete monolithic construction are utilized as the current-carrying means of the electrical heating system.

Still another object of the invention is to provide a reinforcing construction for a monolithic concrete slab construction wherein the reinforcing rods of the reinforcing system provides an electric grid floor heating system and wherein the reinforcing rods are prestressed so that the monolithic reinforced slab construction is prestressed.

A further object of the invention is to provide a simple method for prestressing the combined reinforcing means and heating means for a monolithic concrete floor and/or wall construction of a building construction.

Another object of the invention is to provide a simple combined reinforcing means and electric grid means for an electrical heating system embedded in a monolithic concrete floor construction wherein a ground floor and basement are heated from the poured monolithic concrete slab between the two floors.

Another object of the invention is to provide an efficient electrical heating system for a building wherein the electrical heating system is embedded within, and integrally affixed to a monolithic concrete floor construction wherein the heat of the floor slab is given off very slowly which is advantageous in commercial types of buildings especially manufacturing buildings where trucks are loading in and out, and in which approximately twenty-five percent (25%) of the heat within the floor slab will go into the space therebelow and even if the floor slab is placed on the ground the heat loss is temporary since after the ground has warmed up there is very little heat lost thereafter.

Another object of the invention is to provide an electrical grid floor heating system which is economical to construct and requires very little equipment to operate and which costs less than equipment for radiant heating utilizing water through copper tubes for the same purpose.

Still another object of the invention is to provide an electric grid floor heating system wherein the applied voltage to the electric grids varies within the range of from substantially 16 to 120 volts and preferably within the range of from 30 to 60 volts.

Still another object of the invention is to provide an improved combined reinforcing means and heat means for a monolithic concrete floor slab wherein the floor load per square foot which may be carried is within the range of from two hundred and fifty pounds to one thousand pounds per square foot.

A further object of the invention is to provide an improved electrical heating system comprising reinforcing electric grids embedded within a monolithic concrete floor slab, wherein the temperature of the electric grid may be controlled using a constant or variable voltage depending upon the temperature required and/or the various controls including thermostatic controls used in conjunction with the rods of the electric grid and thermostatic controls of the air temperature and clocks to shut the grids on and off to regulate the heat.

Another object of the invention is to control the temperature regulation of the electric grid floor heating system utilizing a voltage regulator and regulating the voltage between 60 and 30 volts in various settings so that the temperature in the grid can be reduced accordingly; thus, at 30 volts one would have half the heat as would be obtained at 60 volts.

Still another object of the invention is to provide a simple formula for computing the grid spacing of an electric grid floor heating system wherein the temperature variation may vary with the total variation of 40° F. temperature; for example, from 25° F. above zero to a room temperature of 65° F. where mild temperatures are concerned and a wider spacing of the grids in the slabs than would be required under conditions where enough heat would be required for a change of 75° F. in temperature, for example, from 10° F. below zero to 65° F. above, wherein a formula for this particular grid would be to divide 360 by the temperature variation to be effective, such as 60° F. would give the proper spacing in the grid; for example, six inches for a double area that is being heated such as a combination basement and first floor where one might have seven cubic feet per square foot of basement below, and thirteen cubic feet per square foot of floor of first floor area to be heated or a total of twenty cubic feet per square foot of slab. Therefore, for a variation of 90° F. in temperature the grid spacing would be four inches and for a variation of 40° F. temperature, the rod spacing of the grid system would be nine inches, etc.

Still a further object of the invention is to provide an improved electric grid floor heating system wherein the reinforcing means provide the electric heating means of the electrical heating system, and provide a spacing of the reinforcing means within the range of from four inches to nine inches to carry loads up to substantially one thousand pounds per square foot of floor loads.

A still further object of the invention is to provide control joints that completely isolate sections of the building in that no reinforcing steel connects the building units through the control joint.

A further object of the invention is to provide a poured concrete roof for the building construction without utilizing build-up roofing to waterproof a poured concrete roof slab by utilizing control joints and waterstops so that the roof does not crack at other places.

A further object of the invention is to provide a new system of heating for a concrete building construction wherein the reinforcing steel in the floor slab is formed into an electric grid and used to heat the building.

Another object of the invention is to provide a concrete building construction wherein the electric grid of the electrical heating system is the only reinforcing used in the floor other than that in the precast concrete beams and interconnecting poured means between the concrete beams of the building and to provide a floor load within the range of from two hundred and fifty pounds of floor load per square foot to twelve hundred pounds of floor load per square foot.

Still another object of the invention is to provide an electric grid floor heating system for a concrete building utilizing the steel reinforcing means as the electric grid heating system and wherein the steel of the reinforcing means is very high tensile steel and further fabricated by crimping so it has a higher bond value in the reinforced concrete slab greater than is normally had with a high bond reinforcing steel, and also in which the reinforcing steel is prestressed to a point where the steel was carried in a straight line without any sagging of any kind which may be within the range up to substantially fifty percent of the ultimate strength of the reinforcing rods providing the electric grid heating system.

Another object of the invention is to provide a method of curing poured concrete within the period of setting utilizing the heat of an electric grid heating system provided by the reinforcing rods of a reinforced concrete floor construction so that the temperature of the floor slab does not exceed substantially 65° F. so as not to damage the setting of the concrete and furthermore not to weaken the final strength of the concrete.

A further object of the invention is to utilize an air-entrained concrete in the pouring of the reinforced monolithic floor construction wherein the reinforcing rods provide an electric grid heating system therefor, and the air-entrained concrete provides better insulating qualities for the electric grid heating system with substantially less heat loss therefrom.

A still further object of the invention is to provide a reinforcing rod construction for an electric grid floor heating system to give continuous reinforcing of any length of floor area desired, and wherein thirty feet by forty feet or twelve hundred square foot sections may be poured without cracks later forming.

A further object of the invention is to provide an electric grid floor heating system utilizing the floor reinforcing steel in a concrete reinforced floor construction to store heat so that it may use off-peak electricity to improve the load characteristics of the public utilities from which the electricity for heating is utilized and may also be used by utilizing energy during off-peak periods of industrial customers of the public utility furnishing the electrical energy.

A still further object of the invention is to utilize high tensile strength reinforcing rods as the grids of the electric grid floor heating system and/or other forms of commercially available reinforcing materials such as standard metal reinforcing.

A further object of the invention is to provide an electrical heating system provided by the reinforcing material of a reinforced concrete slab construction wherein the depth of the grids may be varied so that if the reinforcing material is positioned at a greater depth in the floor slab, the heat may be accumulated in the monolithic reinforced concrete; or if an electrical grid heating system is desired which is more instantaneous and more sensitive to temperature changes, the reinforcing means providing the electric grid heating system may be placed nearer the surface of the monolithic concrete reinforced slab.

A further object of the invention is to provide an electric grid heating system wherein the rate of heat dissipated by the electric grid floor heating system may be varied with respect to different areas of the reinforced concrete floor slab as to the center and peripheral areas of the floor slab to overcome various heating conditions within the building.

A still further object of the invention is to use supplemental heat sources in combination with the electric grid system and/or circulating devices.

A still further object of the invention is to provide an improved electrical heating system utilizing the reinforcing means of a reinforced monolithic concrete slab to provide floor slabs for prefabricated buildings—either temporary, such as military installations, or permanent for airplane runways to melt the snow and ice thereon and/or for use in concrete highway constructions for reducing accumulations of snow and ice and particularly reinforced concrete slabs for highways such as toll roads and the like, and also for rapid curing of concrete road slabs reinforced in accordance with my invention and poured in low temperature conditions wherein the electrical energy could be applied to the reinforced electric grid heating system and be supplied by portable generators.

In order to accomplish the various objects of the invention, I have provided as one embodiment of my electric grid floor heating system crimped reinforcing rods for a monolithic reinforced floor slab constructed in the form of an electric grid for heating the floor slab preferably wherein the floor slab is positioned as, an example, between the first floor and the basement to provide an effective heating surface, and in which the electric grid heating system is constructed primarily for floor slabs approximately thirty feet by forty feet with the necessary number of electric grid heating systems to suitably heat a two-story monolithic poured concrete building approximately forty feet wide and one hundred and twenty feet long with both the basement and ground floor heated from the poured concrete slab between the two floors. In fabricating, the monolithic reinforced concrete floor construction, the reinforcing means utilized are high tensile strength high carbon steel approximately thirty-five to forty-five carbon and a diameter of substantially 0.272" and wherein the reinforcing rods were crimped longitudinally to increase the bonding strength in the concrete greater than is normally had with a higher bonding reinforcing steel and also in which the reinforcing rods constructed in this manner were prestressed and placed in the concrete floor form prior to the pouring of the concrete. The voltage at which the grids are operated is preferably between 55 to 60 volts alternating current and an ideal length of each grid is substantially two hundred and fifty to three hundred feet in length in order to control the rod temperature to around 100° to 120° which provides substantially an ideal temperature for a floor slab of this type. A reinforced monolithic concrete floor slab providing an electric grid heating system of my invention provides a floor slab suitable for floor loads within the range of from two hundred and fifty to twelve hundred pounds per square foot. Although it is preferred to use the crimped reinforcing rod for fabricating the electric grid system, it is also within the scope of the invention that conventional expanded metal grids or the like fabricated grids from reinforcing rod constructions may be utilized within the scope of my invention. To provide the necessary electrical energy for energization of the electric grid heating system of my invention, high voltage power such as furnished consumers by public utilities may be utilized wherein voltages applied may be properly reduced by conventional transformers which may serve as insulating transformers to the electric grid heating system wherein the final voltage applied to the electric grids is preferably within the range of from 30 to 60 volts and preferably from 55 to 60 volts alternating current. In order to control the supply of electrical energy to the electric grid heating-system, suitable heating transformers to provide the required wattage for the electric grids may be utilized and may vary in size from 10 kva. dry-type heating transformers to 50 kva. dry-type heating transformers, and it is preferable to use a primary voltage on the heating transformers of 480 volts to produce a secondary voltage when stepped down to substantially 55 volts for the operating voltage of the grids. For controlling the energy supplied to each of the grids, suitable timers, temperature controllers, time switches and contactors are used with suitable thermostats placed within the space being heated to control the temperature within predetermined limits together with thermostatic controls in operative relationship with the various electric grids to control the temperature of the grids within predetermined temperature limits. It is also within the scope of the invention that the temperature of the grids may be regulated in addition to the above-mentioned thermostat by conventional outside thermostats to control the temperature in accordance with weather changes by anticipating the weather changes. It is also within the scope of the invention that the electrical energy supplied to the electrical grid heating system may be controlled through suitable time switches to regulate the energy supplied in the off-peak periods of the utilities supplying the electrical energy and also within the off-peak periods of the maximum demand of the consumer.

Many other objects and advantages of the construction herein shown and described will be obvious to those skilled in the art from the disclosure herein given.

To this end, my invention consists in the novel construction, arrangement, and combination of parts herein shown and described and more particularly pointed out in the appended claims.

Referring to the accompanying drawings forming part of the specification:

FIG. 1 is a perspective view of a typical corner unit of a multiple unit building construction in which there is incorporated the electric grid floor heating system of my invention;

FIG. 2 is a schematic multiple grid circuit incorporating the features of the electric grid floor heating system of my invention;

FIG. 3 is a vertical view in cross-section illustrating details of a typical panel heating element of an electric grid floor heating system;

FIG. 4 is an enlarged detail of a connector or coupling for the combined reinforcing rods or bars of the electric grid floor heating system as schematically illustrated in FIG. 2;

FIG. 5 is a schematic wiring diagram of a multiple grid construction operatively connected to a single control panel;

FIG. 6 is a schematic wiring diagram for a control panel for the schematic wiring diagram of a multiple grid panel of FIG. 5;

FIG. 7 is a schematic wiring diagram of grids connected in parallel for the electric grid floor heating system;

FIG. 8 is a schematic wiring diagram of grids connected in a series parallel for a modified wiring connection of the grids of the electric grid floor heating system of my invention;

FIG. 9 is a schematic wiring diagram for a temperature control system for heating panels of the electric grid floor heating system of my invention;

FIG. 10 is a partial perspective view of a monolithic concrete building construction incorporating the features of the electric grid floor heating system;

FIG. 10a is a partial perspective view, partly in cross-section of the remainder of the building construction of FIG. 10 incorporating the electric grid floor heating system of my invention;

FIG. 11 is an enlarged view in elevation, partly in cross-section, of a typical vertical construction joint for all the vertical construction joints of the building construction of FIG. 10 and FIG. 10a;

FIG. 12 is an enlarged perspective view, partly in cross-section of a typical horizontal joint construction for all horizontal construction joints of the building construction of FIGS. 10 and 10a;

FIG. 13 is an enlarged partial perspective view of the concrete form construction illustrating the reinforcing rod construction for the electric grid floor heating system of the building construction of FIGS. 10 and 10a, and further illustrating the structure for prestressing the combined reinforcing and conducting rod construction of the electric grid floor heating system;

Figure 31:
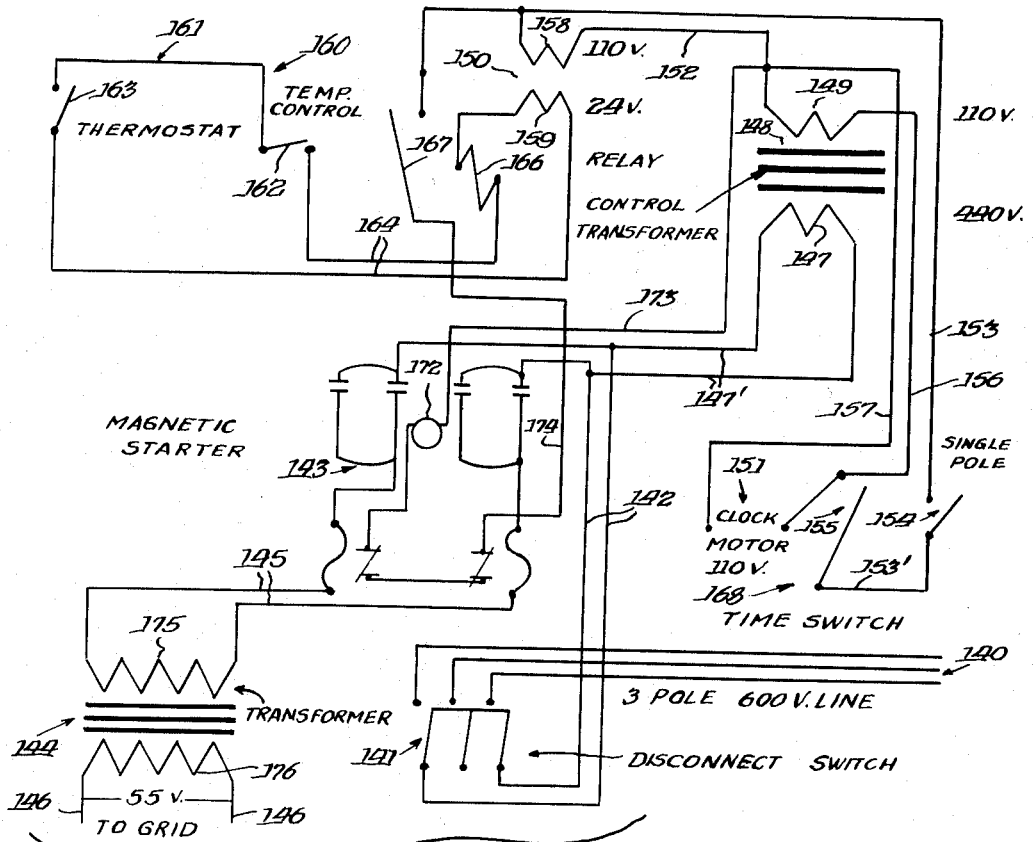
Figure 35:
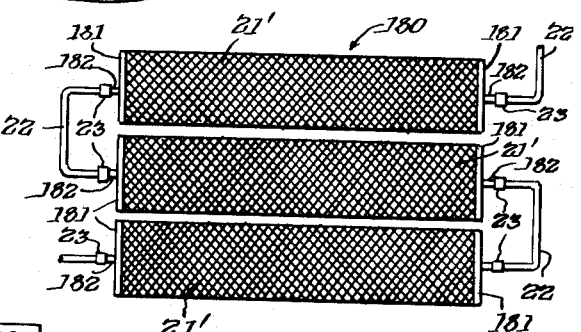
Figure 32:
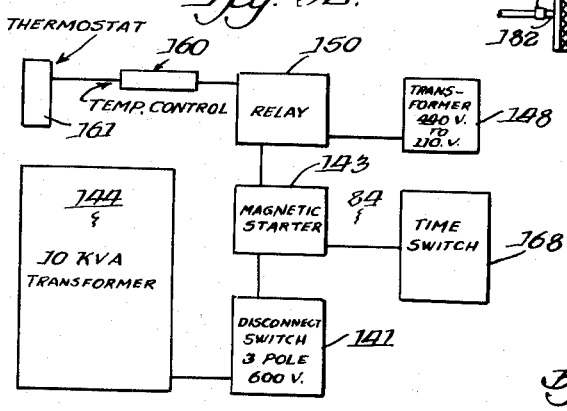
Figure 36:
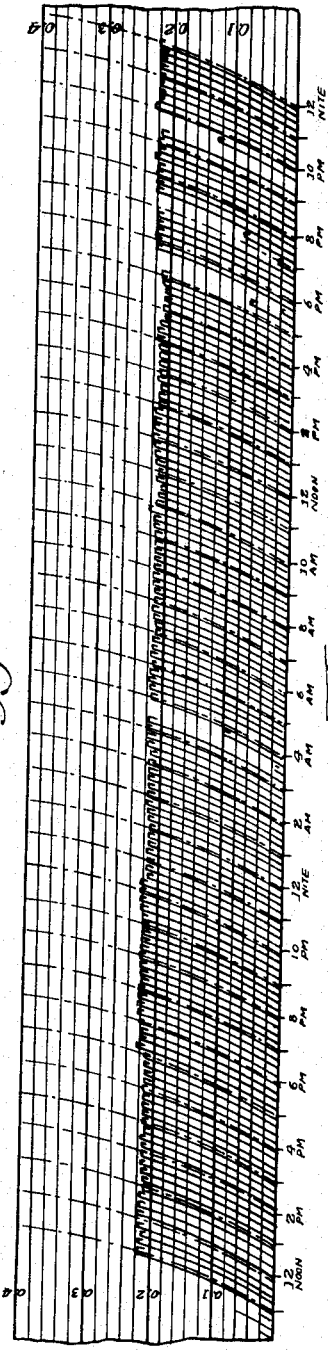
Figure 37:
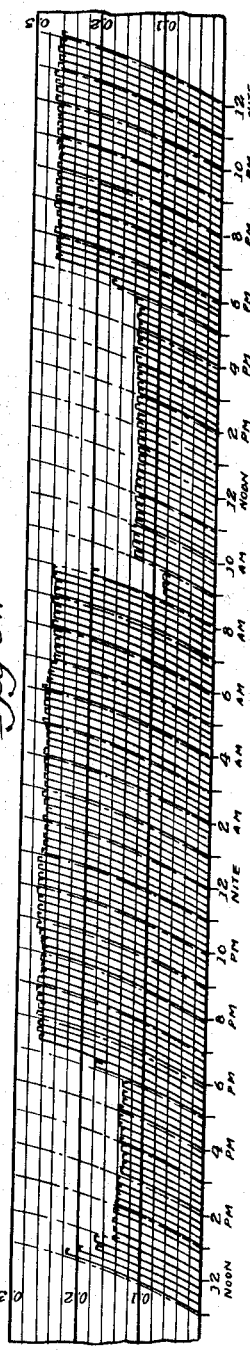
Figure 38:
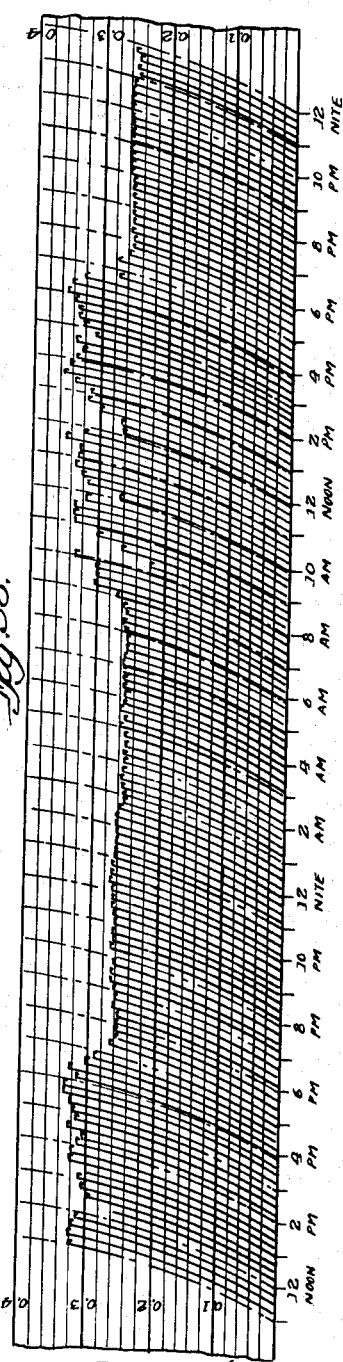
Figure 39:
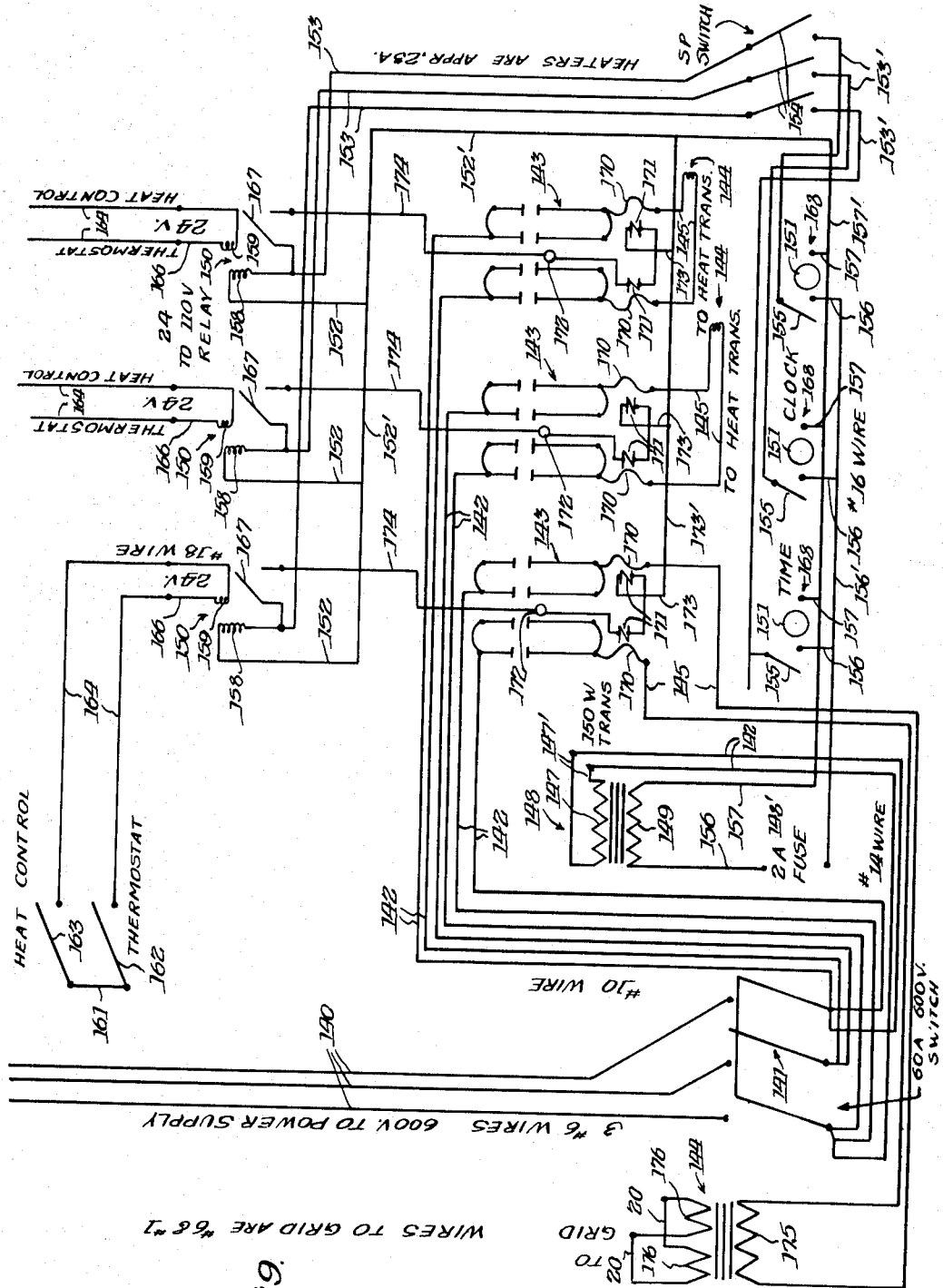
Figure 40:
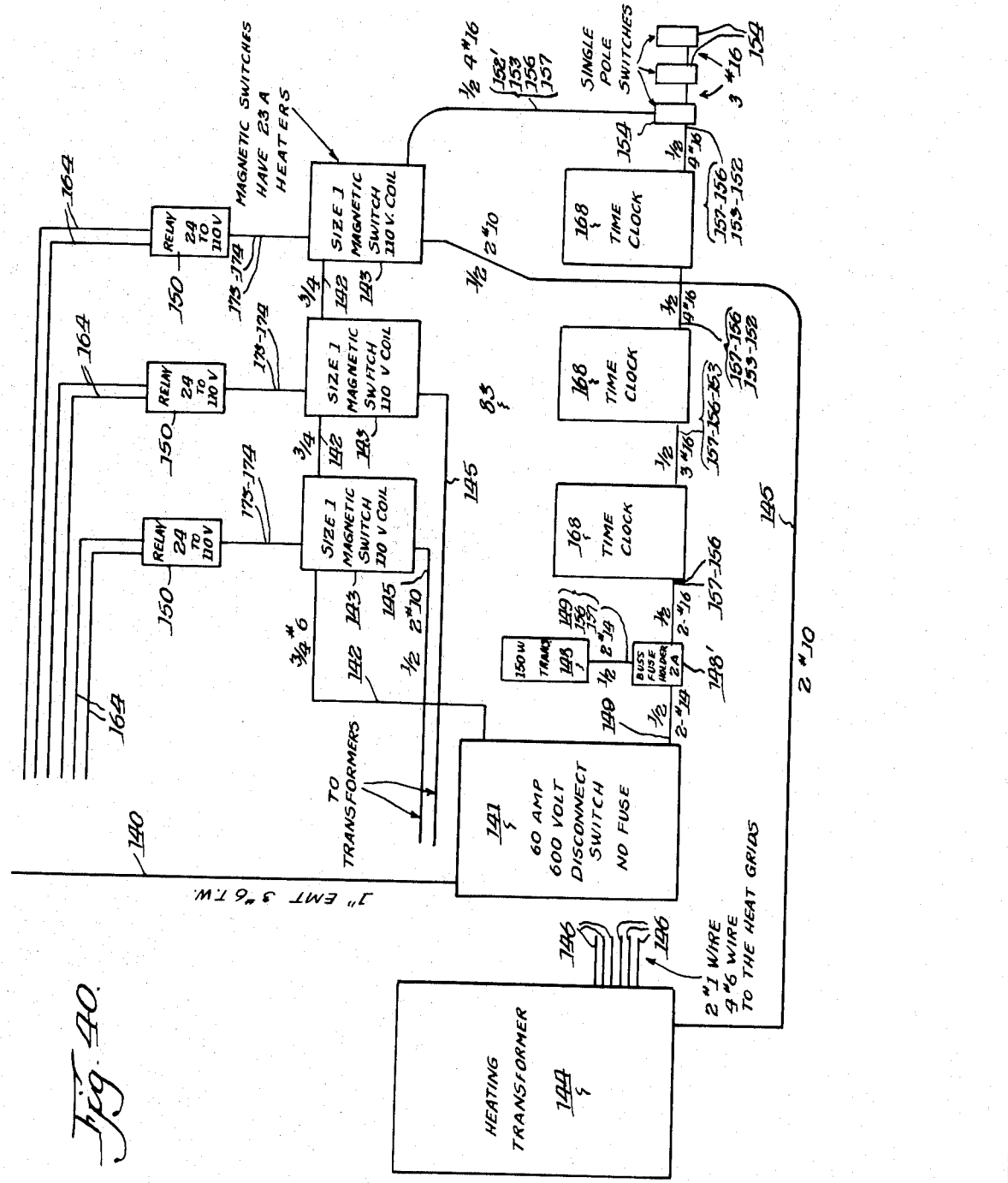

FIG. 14 is an enlarged perspective view, partly in cross-section, of a portion of the concrete form construction and electric grid floor heating system of FIG. 13 illustrating the connectors for connecting the combined reinforcing rods and conducting means of the grid system and electrical connectors at the joint connection between the reinforcing rods for improving the electrical connection between the connected reinforcing rods;

FIG. 15 is a view in elevation, partly in cross-section, illustrating the tensioning device for prestressing the combined reinforcing rods and connecting means of the electric grid floor heating system;

FIG. 16 is a vertical view, partly in cross-section taken along line 16—16, looking in the direction of the arrows, of the tensioning device of FIG. 15;

FIG. 17 is a view in elevation, partly in cross-section, illustrating the precast concrete means of the building construction and the forms for the first floor and the positioning of the reinforcing rods forming the electric grid heating system and a portion of the poured concrete and interconnecting means between the precast concrete beams of the building;

FIG. 18 is an enlarged plan view of a part of the embedded crimped reinforcing rods forming a part of the electric grid heating system;

FIG. 19 is a view in elevation, partly broken away illustrating a vertical grid of the electrical heating system operatively mounted within the plastered building wall;

FIG. 20 is a vertical cross-sectional view, taken along line 20—20 of FIG. 19, looking in the direction of the arrows, of the electrical heating system for a plastered wall;

FIG. 21 is an enlarged plan view of a modified floor electrical grid heating system in which reinforcing rods are positioned transversely with respect to each other which form two electrical grid heating systems;

FIG. 22 is a view in elevation, partly in cross-section of an insulator for spacing two transversely positioned electrical grid heating systems and illustrated in FIG. 21;

FIG. 23 is a plan view, partly in cross-section, of the building construction of FIG. 10 and FIG 10a, illustrating the location of columns, the arrangement of the floor beams, and position of the thermostatic control and transformers of the different grid panels of the electric grid floor heating system of this invention;

FIG. 24 is an enlarged plan view of a portion of FIG. 23 illustrating the location of certain of the panel wiring of the electric grid floor heating system of FIG. 10 and FIG. 10a;

FIG. 25 is a plan view illustrating the electric grid for the driveway through the building of FIG. 10 and FIG. 10a with the electric grid on top of the concrete slab and covered with a tarvia-like material;

FIG. 26 is a view in elevation of a connection of the grid system of FIG. 25 to the source of electrical energy for the electric grid heating system thereof;

FIG. 27 is a connector for the reinforcing rods forming the grid panels B and F of the electric grid floor heating system;

FIG. 28 is a connector for panels G and H of the electric grid floor heating system of this invention;

FIG. 29 is a plan view of a crimped reinforcing rod for an electric grid of the electric heating system of this invention;

FIG. 30 is a plan view illustrating another typical electric grid floor heating panel arrangement for a machine shop;

FIG. 31 is a schematic wiring diagram for the basic wiring diagram including transformer circuits and thermostatic and clock controls and switches therefor for a grid panel of the electric heating system of my invention;

FIG. 32 is a block wiring diagram of the electrical transformer and controls for a panel grid of the electric heating system of this invention;

FIG. 33 is a schematic grid panel wiring diagram for panels A, C, D and E of the electric floor heating system for the building construction of this invention;

FIG. 34 is a wiring diagram for a grid panel for panels B, F, G and H of the electric heating system for the building construction of this invention;

FIG. 35 is a schematic drawing of a mesh reinforcement for a modified grid panel of the electric heating system of my invention;

FIG. 36 is a graph of demand registration data for a typical period from noon of one day through midnight of a following day of the operation of the electric heating system of my invention;

FIG. 37 is a graph of demand registration data of a portion of another month during the operation of the electric heating system of my invention;

FIG. 38 is a graph of demand registration data of another portion of a month of the operation of the electric heating system of this invention;

FIG. 39 is a schematic wiring diagram for a modified control circuit for two grids of the electrical heating system of my invention; and FIG. 40 is a block wiring diagram for the heating transformer and controls of the modified wiring diagram of FIG. 39.

Referring to FIGS. 1 through 9 of the drawings, the theoretical aspects of a floor heating system using electrically energized steel reinforcing means and/or reinforcing bars will be discussed. Referring to FIG. 1, there is schematically illustrated a building construction which may be a simple one-story construction with or without a basement, or may be a one-story construction with a basement or a multi-story building construction. FIG. 1 illustrates a building construction 10 which may have conventional side wall constructions 11 which may be reinforced concrete monolithic wall constructions or built-up walls from conventional concrete blocks or the like building material erected on a footing or foundation 12, and in this instance may have a floor construction 13 which may be fabricated in panel sections with suitable water stops and other forms of expansion joints between the panels. In this particular embodiment, a first floor panel construction 14 supported by a reinforced umbrella-like column structure 15 from a suitable footing or foundation 16 is illustrated, and it is preferred that the umbrella-like column will be integrally fabricated with its respective floor panel construction 14 such as illustrated. This floor panel 14 and column therefor may be suitably poured in place with prefabricated forms therefor for the column and floor, or it may be pre-fabricated either on the building site or at a suitable plant therefor in which the floor panel is fabricated by first erecting the floor form and mounting suitable reinforcement therefor and integrally molding therewith the umbrella-like column having suitable reinforcements therefor with the form vertically positioned with respect to the floor panel. The floor panel and column therefor may be suitably poured and vibrated, and it is within the scope of the invention that a suitable electric grid 17 may be fabricated and integrally molded in the floor panel 14.

Referring to FIG. 2, the electric grid 17 comprises two grids—grid A and grid B connected in parallel to a source of electrical energy preferably alternating current supplied within the voltage range of from substantially 55 volts to 60 volts as furnished by a suitable step-down transformer from available utility power supply at a higher voltage. Referring to FIGS. 3 and 4, grid A19 and B20 comprise a plurality of heating bars 21 connected in series through U-shaped connectors 22, coupled to the ends of a heating bar 21 by suitable couplings 23, such as turnbuckles, FIG. 4, having right and left hand threads for coupling to the right hand threads of the threaded ends of the heating bars 21 and the left hand thread of the connectors 22. It is preferred that the couplings shall preferably be fabricated from a material known to those skilled in the art to be of relatively low electrical resistance, such as copper, brass or other suitable thermally and electrically conductive material, whereas the heating bars are preferably steel reinforcing rods of high tensile strength substantially S.A.E. 1035–1045 carbon. These rods may be straight rods though as will be described later with respect to a preferred installation, it is preferred that these heating bars or rods shall be formed with a suitable undulating crimp to increase the holding power of the heating rod within the concrete within which the heating bars or rods are embedded.

Referring to FIGS. 2, 3 and 4, FIG. 3 particularly illustrates a typical cross-section of a panel heating element as illustrated in FIG. 2. The construction of FIG. 3 is particularly suitable for floor panels laid directly upon the ground. Granular material 24, such as crushed stones, cinders or the like to provide a suitable foundation and drainage is laid in place upon which a suitable waterproofing and insulating material 25 such as fiber board or roofing felt or other suitable asphalt impregnated material is laid and also may incorporate a layer of heat-reflecting material such as aluminum foil covered felted paper or even thin sheets of aluminum to reflect the heat from the heating bars 21 so that the heat therefrom is not lost within the foundation material 24. The heating bars 21 are preferably supported upon mortar blocks 26 as shown in FIGS. 2 and 3, approximately two and one-half inches above the waterproofing and/or insulating material 25. To provide additional reinforcement for the monolithic concrete heating panel, reinforcing rods 27 approximately one-fourth inch in diameter and at a spacing of substantially twelve and one-half inches are located as shown in FIG. 3 approximately one and one-half inches above the waterproofing and insulating material 25 and are preferably supported on the mortar blocks 26 as shown. This concrete layer of one and one-half inches may be poured first, after which the reinforcing bars 27 are laid, or this layer and substantially another one inch layer may be poured thereover at the same time which provide a support for the heating bars 21 which in turn are also supported at their ends upon the mortar blocks 26, as shown in FIGS. 2 and 3 throughout the length of the heating bars 21. After the heating bars 21 and connectors 22 have been placed in position and connected together with the connector 23, another layer of concrete three and one-half inches deep is then poured over the top of the heating bars providing a suitable heat accumulator mass for radiation of heat therefrom to within the building interior.

A floor heating panel unit, as described above, may be constructed, for example, for an area twenty-five feet by twenty-five feet and with a depth of concrete preferably six inches in which the heating bars 21 of the electric grid 17 are embedded preferably half-way between the bottom and top surfaces of the reinforced monolithic concrete heating panel. The reinforcing bars are preferably one-quarter inch in diameter and spaced twelve and one-half inches apart as are the heating bars 21 which are preferably one-quarter inch in diameter and similarly spaced twelve and one-half inches apart. The U-shaped connectors 22 have their legs spaced twelve and one-half inches apart for coupling the heating bars 21 and the length of the legs are substantially three inches so that the overall length for a typical heating bar, together with the connectors, is substantially twenty-four feet, six inches for this particular panel construction. The voltage drop across grid A19 and grid B20 is respectively 57 volts and the current flowing through each grid is substantially 54 amperes, with the grids A and B being connected in parallel to a 57 volt supply at 54 amperes alternating current.

Referring to FIGS. 5 through 9, typical wiring diagrams for connection of the grids of the various panels of the electric heating system of this invention together with typical controls for controlling the electric heating system of this invention will be described. FIG. 5 is a general wiring diagram for a multi-electric grid panel arrangement for a heating system according to this invention. FIG. 5 shows a single control panel schematically, although it is to be understood that individual control panels may be used if more economical or practical. FIG. 5 illustrates a building with a floor plan divided into a series of reinforced concrete monolithic heating panels similar to the heating panel 14 as described with reference to FIGS. 2 and 3. For the purpose of identification floor heating panels A–1 and A–2 are identified respectively as 14a; floor heating panels B–1, B–2, B–3, and B–4 are identified respectively as heating panels 14b; floor heating panels C–1, C–2, C–3, C–4 are identified respectively as floor heating panels 14c; and, panels D–1, D–2, D–3, and D–4 are respectively identified as heating panels 14b. Since the electric grids for each of these heating panels of FIG. 5 are identified, they have been schematically illustrated and identified respectively as grids 19 and 20, these grids being connected in parallel with two of these sets of parallel grids connected in series and connected to a 114 volt alternating current source of energy with an amperage of 107 amperes. The terminals of each pair of these panels for panels B–1, B–2, B–3 and B–4 are connected through the terminals identified B–1–2 and B–3–4 with the ground side of each of these circuits connected to a common ground wire 28. The panels sets C–1 and C–2 are connected to the control panel terminal C–1–2 and the two sets of panels C–3 and C–4 are connected on one side to control panel terminal C–3–4, whereas the ground sides of each set of these panels are connected to the common ground wire 28. Similarly, the sets of panels D–1 and D–2 are connected to the control panel terminals D–1–2 and the other set of panels D–3 and D–4 are connected to the control panel terminal D–3–4, and likewise the ground connections for each of these sets of panels are connected to the common ground wire 28 to ground 28'. Similarly, the set of panels A–1 and A–2 are connected to the control panel by the control panel terminals A–1 and A–2. The various sets of heating panels 14a, 14b, 14c and 14d may be considered, for example, as the electric heating panels of one building, or, for example, the sets of panels 14a may be considered for an office building; and the panels 14b, 14c and 14d may be considered respectively as floor panels of a separate operating plant or building, for example, plant B; floor heating panels C–1, C–2, C–3 and C–4 may be for a separate plant C or building therefor, and, panels D–1, D–2, D–3, and D–4 may be for another building or plant D.

Referring to FIG. 6, there is illustrated a control panel for the general wiring diagrams of a multiple circuit electric grid panel heating system of FIG. 5. As illustrated schematically in FIG. 5, the various sets of grid panel arrangements respectively 14a, 14b, 14c and 14d comprising the grids A19 and B20 are connected in a series parallel arrangement as shown in FIGS. 5 and 6 with the respective ground connections 29 operatively connected to the common ground wire 28 to ground 28'. The positive side of each of these sets of electric grid panels 14a, 14b, 14c and 14d are respectively connected through their respective circuits identified as A–1–2, B–1–2, B–3–4, C–1–2, C–3–4, D–1–2 and D–3–4, and each of these respective lead wires, since they are similar, are identified by a reference character 30 to a magnetic contactor 31 in the circuit of the electric grid panels 14a and through a double magnetic contactor for the respective sets of electric grid panels 14b, 14c and 14d. Each of these double magnetic contactors include a single magnetic contactor 31 similar to the magnetic contactor for the set of grid panels 14a. Each of the circuits 30 are in series with the respective magnetic contactor 31 therefor and a fuse 33. Each of these circuits 30 for the grid panel 14a and 14b are connected in parallel with the 115 volt positive side of the circuit 33 and to the ground wire thereof through the circuits 29. Similarly, the circuits 30 for the grid panels 14c and 14d are connected to the positive side of the 115 volt circuit 34' and these grid panel sets are connected to the ground wire 28 to the circuit 29. The two 115 volt circuits 34 and 34' are connected to a circuit breaker 35 and positive terminals 35' and ground terminal 35a. The line sides of the circuit breaker 35 are connected to a step-up transformer 36 through the circuits 34b and ground connection 28a. The primary transformer 36a is connected to an available supply of voltage, in this instance preferably 115 volts; and the secondary windings 36b deliver 115 volts to the circuits 34 and 34' to the ground connection and/or 230 volts maximum. The transformer 36, in this particular arrangement, is rated at 100 kva and the full load carried by this transformer at 114 volts is 749 amperes for the arrangement illustrated.

In order to control the energy supplied to the electric grid panel units in accordance with the room temperature and temperature of the bars of the electric grid system, a suitable temperature control 37 with relay for each of the electric grid panel circuits 14a, 14b, 14c and 14d are operatively connected through a suitable relay 38 to their respective magnetic contactors 31 for the actuation thereof through temperature changes in accordance with the predetermined setting as determined by the temperature detector for each of the electric grid panel sets 14a, 14b, 14c and 14d as illustrated in FIG. 6. The temperature detector 39 may be located contiguous to one of the heating bars 21 of one of the grids 19 or 20 which may be preselected to suitably integrate an average mean temperature, for example, of the heating bars of the respective grids of each of the arrangements of grids for the different panel arrangements. Energy is supplied to each of the temperature controls with relay 37 by a 115 volt circuit connected through the leads 40 and 41 respectively, to the positive side of the 115 volt circuit as determined by the positive supply lines 34 and 34' and ground connection 28. Each of the temperature detectors 39 are operatively connected to the temperature control 37 therefor through a circuit 42. Each temperature detector 39 may be in the form of a suitable thermo-couple commercially available, as are the temperature controls 37, relays 38 and magnetic contactors 31. Although 115 volts are supplied to the temperature control 37 for each of the circuits, suitable transformers may be supplied within the temperature control for reducing the voltage for operation of the relays, etc., as is well understood in the art. A suitable room thermostat temperature control (not shown) may also be operatively connected to each of the temperature controls 37. This will be described with reference to the block diagram of FIG. 9 to be described later. It is therefore evident that with the control panel as described with reference to FIG. 6, a simplified control panel has been disclosed for the actuation of electric grid panels in multiple arrangements as illustrated, for example, in FIG. 5.

Referring to FIGS. 7 and 8, there is schematically illustrated a grid arrangement for grids in parallel, as shown in FIG. 7, and grids in a series parallel arrangement as shown in FIG. 8. Referring to FIG. 7, the grids arranged in parallel show an arrangement for a panel with the grids A19 and B20 arranged as illustrated in FIG. 2. With this arrangement, the grids 19 and 20 are schematically illustrated as impedances since the heating bars 21 forming the grids are connected to an alternating current circuit. The electric grid panels 19 and 20 are connected in parallel to an A.C. supply circuit 18—18 operatively connected to the secondary of a 115 volt single phase transformer 43. The primary circuit of the transformer is operatively connected to the line side of a volt or alternating current circuit for supplying electrical energy to the electric grid panels of the electric heating system of this invention. The secondary winding of the transformer 43 is adapted for supplying 57 volts at 109 amperes to the parallel arrangement on the grid circuits 19 and 20. Each of these grid circuits 19 and 20 are substantially three hundred feet long and require a voltage drop of 57 volts across the terminals to supply a current of 54.3 amperes.

Referring to FIG. 8, there is schematically illustrated a 115 volt alternating current circuit for supplying a grid circuit arrangement for two panels of an electric heating system of the panel arrangement as illustrated in FIGS. 5 and 6. In this particular panel arrangement of FIG. 5, the grid circuits 19 and 20 are respectively four hundred and thirty-eight feet long, requiring 57 volts across each terminal which in turn supplies 37 amperes current through each grid 19 and 20. Since this is a series parallel arrangement of the grids, 115 volts are required across the terminals as shown in FIG. 8 with a total current flow of 74 amperes.

Referring to FIG. 7, the arrangement of the grid bar 21 with reference to the arrangement of FIG. 2 is a twelve inch spacing and each circuit is approximately three hundred feet long. The output of such a circuit is equal to 10.5 watts.

Referring to FIG. 8 which is illustrative of the arrangement of FIGS. 5 and 6, the grid bars are arranged at four inch spacing and each circuit is approximately four hundred and thirty-eight feet long. The output of each circuit is approximately 14 watts. The panel wattage increases with increase in bar spacing. Bars of twelve inch spacing will give an output of 40 watts per square foot, whereas a six inch spacing of bars will give an output of 20 watts per square foot.

Referring to FIG. 9, there is schematically illustrated a block wiring diagram illustrating the temperature control system for the electric grid heating panels of the electrical heating system as illustrated in FIGS. 5 and 6. There is illustrated in cross-section, in FIG. 9, a portion of a multiple floor panel as may be schematically illustrated, for example, in FIGS. 1, 2, 3, 5 and 6 in which a foundation or footing 16 is shown supporting a column 15 and on which are positioned two similar contiguous floor panels 14 which may be constructed as illustrated in FIGS. 2 and 3 with the cold reinforcing bars 27 and hot heating bars 21 as particularly described with reference to FIG. 3. Embedded in the reinforced concrete floor panel for each panel unit is a temperature detector 39 contiguously positioned with respect to one or more of the electrical heating bars 21 which may also serve as reinforcing bars in the electric heating system of this invention. The temperature detector or thermo-couple 39 is operatively connected to its respective temperature control with relays 37 through the circuit 42 therefor. The temperature control with relays 37 for each of the grid panels is illustrated as being connected in series through a lead wire 44 and in turn to a terminal of a two-pole contactor 32 as illustrated in FIG. 6 through a lead wire 45. A room thermostat 46 is connected to the temperature control with relay 37 through a connection 47 from one terminal of the room thermostat and the other terminal of the room thermostat 46 is connected to a terminal of the two-pole contactor 32 by a lead wire 48. The two-pole contactor 32 is connected to a 115 volt supply circuit 34 to the positive side of the alternating current supply and to the ground connection 28. The heating unit 20 of a floor panel unit 14a, as illustrated in FIGS. 5 and 6, is operatively connected to the two-pole contactor 31 through the lead wires 30 and 29.

Referring to FIG. 9, the room thermostat 46 is preferably a model T42A Minneapolis-Honeywell room thermostat. The temperature control units 37 are preferably a model T415A Minneapolis-Honeywell panel temperature control unit. The two-pole contactor 31 is preferably a General Electric Model CR2810–C2RA2-two-pole contactor. It is also to be understood that other suitable commercial forms of room thermostats, temperature control units and switches may be used without departing from the scope of the invention.

With the floor heating system as disclosed with respect to FIGS. 1 through 6 and the wiring diagrams therefor, the design conditions for which the heating system of the embodiments of FIGS. 1 through 9 may be used, the heating calculations therefor, the electrical circuits for heating the grids including the low voltage circuit in parallel, as illustrated in FIGS. 2 and 7, and the series parallel circuits of the embodiments of FIGS. 5, 6, and 8; the insulation of heating grids, and the control system for each heating panel will be discussed.

In accordance with the design conditions for an electric floor heating system using electrically energized steel reinforcing bars, the outside design temperatures to be considered are 10–20–30 and 40° F., with an inside design room air temperature of 70° F. Under these conditions, the floor surface temperature is 85° F. maximum. The heating medium is 60 cycle A.C. electricity. The electric resistance units and/or reinforcing bars consist of one-fourth inch diameter steel bars of high strength steel (C1020 or C1045) with an electrical resistance of 0.00174 ohm resistance per foot to 0.0035 ohm per foot. The grid voltage is preferably not to exceed 60 volts for bare wire installation. The grid voltage is preferably not to exceed 60 volts for bare wire installation though it is within the scope of the invention that higher voltages such as 110–120 volts may be used with the electrical resistance units and/or reinforcing bars 21 suitably coated with an insulating material such as a silicone such as manufactured by Dow Chemical Company, the material being colorless or colored with a suitable color for indicating that the rods, as fabricated, have been suitably insulated. It is also within the scope of the invention that the monolithic reinforced electric grid panels, after the concrete has been poured and set, may be suitably treated with a silicone material to eliminate moisture from getting in if it is not desired to insulate the heating bars 21 with a suitable insulating material. The insulating material for the embedded heating bars 21 should be of such material which will thoroughly insulate the insulating bars but yet permit of ready transmission of the heat developed in the heating bars to the surrounding concrete of the monolithic heating panel. It is also within the scope of the invention that added protection may be had for the electrical heating elements 21 when embedded within the concrete of the heating panels by spraying with an alkaline-proof lacquer though it is preferred if the grids are coated to coat with a suitable silicone material by spraying or dipping.

The plant area considered is a building seventy-five feet by one hundred feet with a twelve foot ceiling, having no windows, and the walls preferably ten inches solid concrete with no finish. The ceilings are to be six inches thick concrete with one inch insulation board and built up roofing. There is to be no basement and the floor is preferably formed from six inch concrete slabs, twenty-four feet and four and one-half inches square placed on twelve inches of granular fill as illustrated in FIG. 3, with an insulation and moisture barrier between the concrete and fill. The building is to have three eight foot by eight foot foot and two three foot by 6.5 foot doors.

The office area for the plant area is twenty-five feet by fifty feet with ten foot ceilings. The outside walls are the same as for the plant area as are the ceiling and floor. There is to be five hundred square feet of glass area of "Thermopane" construction.

The heat transmission co-efficients to be considered are the outside walls with a heat co-effiicent U–0.63, the ceiling heat co-efficient being U–0.22, the glass heat transmission co-efficient being U–0.55, and the floor heat transmission co-efficient being U–0.10. The infiltration to be considered is one change per hour.

A summary of the heating calculations for a floor heating system based on the previous design information is presented in Table I. Panel output has been determined for four possible outside air temperature conditions. The lowest value of 10° F. is the recommended design temperature for the Portland, Oregon area as suggested by the American Society of Heating and Ventilating Engineers. The higher temperature of 40° F. was based on an understanding that the air temperature in the plant area would very seldom drop below this value in the daytime. Maximum floor temperature is considered 85° F. and room air temperature 70° F.

It may be seen from the data in Table I that a panel output of 10 watts per square foot would perhaps handle the heating demand satisfactorily at an outside air temperature as low as 30° F. However, a panel output of approximately 12 watts per square foot would insure sufficient heat for all but the most extreme cases. Therefore, this value has been used in designing the system.

*TABLE 1.—Summary of heating calculation data*

|  | Outside Air Temperature, ° F. | | | |
| --- | --- | --- | --- | --- |
|  | 10 | 20 | 30 | 40 |
| FOR PLANT AREA | | | | |
| 1. Total heat loss, B.t.u | 345,300 | 287,500 | 230,100 | 172,500 |
| 2. Total floor output, B.t.u | 314,000 | 305,000 | 289,000 | 280,000 |
| 3. Relation of (2) to (1) | −31,300 | +17,500 | +58,900 | +107,500 |
| 4. Panel input, watts | 7,400 | 7,040 | 6,680 | 6,450 |
| 5. Panel input, watts/sq. ft | 12.5 | 11.9 | 11.3 | 10.9 |
| FOR OFFICE AREA | | | | |
| 1. Total heat loss, B.t.u | 74,800 | 62,400 | 49,870 | 37,410 |
| 2. Total floor output, B.t.u | 55,000 | 51,300 | 49,500 | 48,200 |
| 3. Relation of (2) to (1) | −19,800 | −11,100 | −370 | +10,790 |
| 4. Panel input, watts | 7,620 | 7,090 | 6,850 | 6,050 |
| 5. Panel input, watts/sq. ft | 12.9 | 12.0 | 11.6 | 10.2 |

Several different electrical circuits for the heating grids are disclosed which may be used to energize each panel under separate control. The circuits have been calculated to keep grid voltages less than 60 volts alternating current and the amperage as low as possible. Each panel of the building as disclosed with reference to FIG. 5 is calculated to produce an output of substantially 12 watts per square foot. Referring to the low voltage circuit in parallel as described with reference to FIGS. 2 and 7, the circuit therefor preferably comprises two or more grids in parallel with the heating bar spacing preferably twelve inches or less. The electric circuit for the heating grids in parallel to FIGS. 2 and 7 will require the installation of a step-down transformer 43 to produce the desired voltage. A circuit of this type is satisfactory for the electric heating panels of the building or for any outside area. This circuit permits of any desired range of grid voltages and wire spacing. Calculations for three typical cases of a number of grids and wire spacing are tabulated in Table II.

TABLE II.—*Calculations for low voltage circuits in parallel*

| No. | No of Grids | Length of each Grid in Ft. | Wire Spacing, Inches | Volts | Amperes | Wattage Output | |
| --- | --- | --- | --- | --- | --- | --- | --- |
| | | | | | | Total Panel | Per sq. ft. |
| 1 | 2 | 300 | 12 | 60 | 116 | 6,960 | 11.8 |
| | 2 | 300 | 12 | 57 | 108.6 | 6,190 | 10.5 |
| 2 | 3 | 300 | 8 | 50 | 143 | 7,150 | 12.1 |
| 3 | 4 | 300 | 6 | 43 | 165 | 7,100 | 12.0 |

With a series parallel circuit as described with reference to FIGS. 5, 6 and 8, the heating panel size 24.3 ft. by 24.3 ft., and the resistance of the reinforcing and heating bars 21 are such that it is possible to calculate the heating grid circuit to operate directly on 110 or 115 volts alternating current without the need for a step-down transformer. The following grid embodiments are based on that supposition. Two embodiments are disclosed within the scope of this invention and they are designated as Embodiment 2A and Embodiment 2B.

Embodiment 2A. In this embodiment, the wires have been made a definite length and spaced at the proper interval to give the desired panel output of substantially 12 watts per square foot. In order to accomplish this, each grid wire must be approximately four hundred and thirty-eight feet along. Since there must be four such grids in parallel, the spacing of the wires will be approximately four inches apart, and the circuit therefor is schematically illustrated in FIG. 7. The calculated output wattage for such an embodiment is approximately 14 watts per square foot at a grid voltage of 57 volts alternating current. Total amperage for each panel will be approximately 74 amperes.

Embodiment 2B. In this embodiment, the spacing of the wires is preferably selected as six inches in which case the wire length will decrease from approximately four hundred and thirty-eight feet to approximately two hundred and ninety-four feet. This will decrease the total resistance of the heating bars or wires resulting in a corresponding increase in the total amperage from 74 amperes to 106 amperes. The output of each panel would be substantially 106×110 or 11,600 watts, or approximately 20 watts per square foot as compared to a preferred value of 12 watts per square foot. This particular circuit is also schematically illustrated in FIG. 8.

Calculations for Embodiments 2A and 2B are given in Table III, under circuit Nos. 9 and 7, respectively.

tric heating grid of the floor panels of the building construction.

Referring to FIGS. 6 and 9, the control system for each heating panel in the plant as schematically illustrated in FIGS. 5 and 6 was previously described. It is preferred that the control system for each panel in the plant area as illustrated in FIG. 5 should consist of the following control units as schematically illustrated in the block diagram of FIG. 9:

One Honeywell Heavy Duty Line Voltage Room Thermostat Model T42A range 40–80 degrees F., 115 volts A.C. to control through air temperature.

Two Honeywell Panel Temperature Control Units, Model T415A, range 60–100 degrees F., differential scale setting of 1 degree F. operating on 115 volts. As shown in FIG. 9, it is preferred to connect the two units 37 in such a way as to serve as a safety feature in case one unit should fail under use. The capsule for the temperature detector 39 and tubing therefor, should be copper. The tube length should be ten feet long.

One A.C.–115 volt, 135 Amp., 2 Pole Contactor, General Electric Model CR2810–C24A2 as identified by the reference character 31 should be used or other equal or similar type of contactor may be used.

For the control system for panels in the office as schematically illustrated in FIGS. 5 and 6, it is preferred that the room thermostat shall be replaced by a Minneapolis-Honeywell Electronic Moduflow Control or equal, Model Y216A. This type of unit will control panel and room temperature in relation to rise and fall of outside temperature. Better control for the plant area might be effected, if necessary, by the installation of such units at the panels along the outside wall of the plant.

Referring to FIGS. 10, 10a, 11, 12, 23 through 29, 33 and 34 the particular building construction of my invention, together with the electric grid floor heating system therefor, will now be particularly described. A preferred TABLE III.—*Embodiment No. 2—Calculations for low voltage circuits in series-parallel*

[4 grids in each circuit, 57 volt grid voltage]

| Circuit No. | Wire Specimen, Inches | Grid Length in ft. | Resistance, Ohms | Panel Amperage | Panel Voltage | Panel Wattage | Watts per Sq. Ft. |
|---|---|---|---|---|---|---|---|
| 1 | 12 | 150 | 0.525 | 210 | 115 | 24,100 | 40.8 |
| 2 | 11 | 163 | 0.572 | 192 | 115 | 22,000 | 37.2 |
| 3 | 10 | 178 | 0.624 | 176 | 115 | 20,200 | 34.2 |
| 4 | 9 | 198 | 0.694 | 158 | 115 | 18,200 | 30.8 |
| 5 | 8 | 222 | 0.778 | 142 | 115 | 16,300 | 27.6 |
| 6 | 7 | 254 | 0.890 | 124 | 115 | 14,300 | 24.2 |
| 7 | 6 | 294 | 1.030 | 106 | 115 | 12,150 | 20.6 |
| 8 | 5 | 354 | 1.240 | 88 | 115 | 10,110 | 17.3 |
| 9 | 4 | 438 | 1.530 | 74 | 115 | 8,510 | 14.4 |
| 10 | 3 | 588 | 2.040 | 54 | 115 | 6,200 | 10.5 |

For the installation of the electric heating grids of the electric heating system of this invention, a slab thickness as described with reference to FIG. 3 is satisfactory to carry the floor load without the use of load supporting steel. Reinforcements 27 will serve a dual purpose of (1) supplying heat to the floor slab 14, and (2) as crack control steel to hold the sections of concrete together in the event of a crack formation. Referring to FIG. 3, the steel bars should be laid in two levels approximately three inches apart. One lower level of steel should be placed between one and one-half of two inches from the bottom of the slab. The steel reinforcing bars of this section may be placed on twelve inch centers, whereas the other level of steel comprising the heating grid 17 should be placed between one and one-half to two inches from the surface of the concrete. The top bars should be laid normal to the bottom layer of steel. The spacing of the heating bars 21 will depend upon the type of electric circuit to be utilized. There will be described later, a preferred installation of electric heating grids in a modern concrete building construction in which the reinforcing bars are prestressed and serve as the heating bars of the elecbuilding construction 10′ as illustrated in FIGS. 10 and 10a over the building construction of FIG. 1 comprises side walls 11′ and end walls 11″. The side walls 11′ which extend longitudinally with respect to the length of the building include a series of reinforced monolithic concrete wall panels 55 including vertically extending control joint constructions 56 between the contiguous concrete panels 55. Referring to FIG. 11 there is illustrated an enlarged view of this improved form of control joint construction over that as disclosed and claimed in my U.S. Patent No. 2,695,513 granted Nov. 30, 1954 for Control Joint Strip. In erecting the building construction of this invention after the footings 12 have been poured and set, the concrete forms are erected thereon for the particular height of cellar and first floor—in this case being substantially seven feet for the height of the cellar and substantially thirteen feet for the ceiling height of the first floor space. The building is substantially forty feet, ten inches wide by one hundred and thirty four feet long. Columns 57 along with double columns 58 were placed on the center line of the building as shown in FIGS. 23 and 24 for supporting the reinforced concrete floor 59 and also for supporting the waterproof roof construction 60 as shown in FIGS. 10 and 10a. Similarly, supporting columns 57 and double columns 58 were used in supporting the concrete waterproof roof constructions 60. The double columns 58 provided the horizontal control joint construction between the reinforced contiguous panels of the reinforced concrete floor construction 59 and the reinforced concrete roof slabs 61. Referring to FIG. 10a, the right hand end of the building was divided into three sections from right to left of 28.5 feet, two at 28 feet, a driveway section 62 of 18.5 feet, FIG. 10a and FIG. 10, and a section 25 feet at the left end of the building. The first three sections of the building in this particular embodiment were preferably for manufacturing in which heavy presses and the like were supported on the first floor along with heavy loads of steel and the left hand section was for use as a machine shop in which conventional machine tools were located. Cellar areas were located under these sections with the exception that the driveway was located at street level. With respect to the three sections used for manufacturing, no reinforcing steel extended through the joints between the sections as supported upon the double columns 58. Although only the side walls were provided with a reinforced control joint construction as illustrated in FIG. 11, it is also within the scope of the invention that a similar type of reinforced control joint strip may be used in the control joint construction between contiguous reinforced concrete roof slabs 61.

Referring to FIG. 11, as the monolithic reinforced concrete panels 55 are poured individually the concrete forms therefor are erected in a conventional manner and a control joint strip 63 is erected within the form as disclosed in the above-mentioned patent. The control joint strip 63 includes a trapezoidal molded strip 63' and a steel reinforcing strip 63''. Steel reinforcing rods 64 of sufficient length to extend across the control joint are suitably positioned within the form for the panel to be poured, for example, the left panel 55 of FIG. 11, with the ends protruding and to be integrally embedded upon the pouring of the contiguous section 55'. The reinforcing rods 64 include a plurality of longitudinally extending undulating anchoring deformations formed thereon as illustrated in FIG. 11 wherein said deformations are displaced laterally within the range of substantially greater than the thickness of the reinforcing rods but less than twice the thickness thereof as disclosed and claimed in my co-pending application Serial No. 469,189 filed Nov. 16, 1954 for Anchors for Concrete Forms and Apparatus for Handling Forms, and is a division of my U.S. Patent No. 2,825,115 issued Mar. 4, 1958 for Apparatus for Handling Forms. The reinforcing rods 64 are vertically positioned with respect to the vertically extending control joint construction 56 the full height of the side walls of the building as illustrated in FIGS. 10 and 10a. In this particular building construction, the side walls are substantially eight inches thick. In pouring these vertical side wall monolithic reinforced concrete panels 55 if, for example, the right end panel 55 as shown in FIG. 10a was poured first and the third panel to the left thereof was poured next, the reinforcing rods 64 of the first control joint construction 56a would then be inclined opposite to the inclination as shown. This is done so that the rods which have their ends extending into the forms to be poured are inclined downwardly so that they are preferably in tension under the weight of the concrete of the section which is being poured. However, if the panel sections are being poured one after the other, the reinforcing rods 64 as illustrated in the control joint constructions 56 and 56a of FIG. 10 may be set as illustrated.

Referring to FIG. 12, there is illustrated a preferred form of a horizontally extending control joint construction 65 between contiguous reinforced concrete roof panels 61 and as further illustrated in the building construction of FIGS. 10 and 10a. This control joint construction 65 comprises an improved form of control joint strip 66 over that as disclosed and claimed in my U.S. Patent No. 2,695,513 granted November 30, 1954 for Control Joint Strip. The control joint strip 66 is preferably formed from rubber or suitable plastic material including laterally extending reinforcing means integrally molded on opposite sides of the strip comprising web-shaped portions 67 and substantially large members 68 formed on the web-shaped portion. The control joint strip 66 includes a vertically extending portion 69 permitting the concrete construction to crack at the control joint construction and the crack concealed and unsightly cracks prevented. The web-shaped portions 67 and enlarged member 68 also permit positive stretching action as well as a compressive action at the control joint depending upon whether the concrete is contracting or expanding. The control joint strip also provides a seal at the joint construction preventing seepage of moisture upon the expansion and contraction of the roof slabs 61 of the waterproof roof construction. A lower extending portion 70 provides additional sealing for the control joint and also serves for mounting the control joint 66 to the concrete form for pouring the roof slabs. If found desirable, control joint strips may be likewise similarly embedded between the edges of the concrete roof slabs and the contiguous portions of the concrete panels 55 of the building side walls 11' at the juncture of the roof slabs with the side walls. With such roof construction it is unnecessary to have the usual mopped down roof covering including layers of roofing felt mopped down with hot asphalt. If desirable, the same type of horizontal control joint construction may be used between contiguous floor panels corresponding to the reinforced concrete roof slabs if it is necessary to have a waterproof floor construction to prevent any leakage of moisture, for example, in washing down the floor so that this moisture would leak into the cellar area.

The concrete roof slabs 61, as well as the corresponding floor slabs of the reinforced concrete floor construction 59 were poured on precast concrete I-beams 71 as illustrated in FIG. 10 and integrally supported at the center of the building by a reinforced concrete beam 72 at the center of the building and a similar reinforced concrete beam structure 73 for the concrete floor construction 59. Referring to FIGS. 23 and 24, the dotted center lines 71 show a relative position of the precast concrete I-beams for the concrete floor construction. Transverse reinforced concrete beam constructions 74 are located transversely with respect to a longitudinally extending center beam at the double columns 58 for supporting contiguous edges of the reinforced concrete floor slabs of the floor construction 59.

Referring to the left hand floor construction 59' of FIG. 10, a stair opening 75 for a stairway 76 and an opening 77 for an elevator hoist, is provided. Referring to FIG. 10a and FIGS. 23 and 24, a stair opening 75 is also provided for a stairway 76. Similarly an opening 77 may be used for either a stairway or elevator hoist for this end of the building.

A driveway section 62 is provided with the inclined loading platform 78 as illustrated in FIG. 23. The driveway section 62 is provided with door openings 79. The building construction 10' has no windows but only the door openings 80 at the left hand side of the building and similar openings 80' in one side of the building which are primarily loading car openings. Suitable walls next to the driveway for the section 59 and 59' of the building are provided with suitable openings therein for reaching the loading platform 78.

Referring to FIGS. 10, 10a, 23 through 29, 33 and 34, the particular reinforced panel construction providing the electric grids for the electric grid floor heating system of this invention will be described. Referring to FIG. 10a, the reinforced concrete floor construction 59 for the electric grid floor heating system of the manufacturing portion of the building preferably comprises a plurality of monolithic reinforced concrete floor panel: Panel A, including panel wiring O—O; Panel B including panel wiring O; Panel C including panel wiring O—O; Panel D including panel wiring O—O; Panel E including panel wiring O—O, and Panel F including panel wiring O. These panels including the reinforcement means and/or reinforcing rods for the respective panels and which also provide the electric grid construction of the electric grid floor heating system of this invention. The reinforced concrete floor panels which provide the floor construction 59' for the machine shop end of the building preferably comprise Panel G including panel wiring O, and Panel H including panel wiring O.

Referring to FIGS. 10, 10a, 23 and 24, each of the panels A, B, C, D, E, F, G, and H are similarly formed from heating bars and/or reinforcing rods 21 as described with reference to FIGS. 2, 3 and 4 and in which the ends of the heating bars and/or reinforcing rods 21 are coupled together by a U-shaped connector 22 with couplings 23. These couplings 23 may be of steel or other suitable ferrous metal and preferably are formed from non-ferrous metal to prevent any heating at the threaded ends of the rods 21 and U-shaped connectors 22 to which they are complementally threaded. The U-shaped connectors 22 connect the longitudinally and laterally spaced reinforcing rods 21 into a series electrical circuit forming an electric grid for the electric grid floor heating system of the reinforced concrete floor construction 59 and 59' of the building. Panel A is substantially 1125 lineal feet having an output of 5600 watts. Panel B has a length of 580 lineal feet with an output of 4800 watts. Panel C has a length of 1125 lineal feet with an output of 5400 watts. Panel D has a length of 1125 lineal feet with an output of 5400 watts. Panel E has a length of 1125 lineal feet with an output of 5700 watts. Panel F has a length of 580 lineal feet with an output of 4610 watts. Panel G has a length of 658 lineal feet with an output of 4000 watts. Panel H has a length of 658 lineal feet with an output of 4500 watts. Referring to FIG. 23 and FIG. 24, Panel A and Panel B are operatively connected together to a transformer 81 located in the basement and to a thermostat 82 located at conventional heights above the first floor. Similarly Panel C and Panel D are operatively connected together to a transformer 81 and a thermostat 82. Likewise Panel E and Panel F are similarly connected together to a transformer 81 and a thermostat 82. Also Panel G and Panel H are operatively connected together and to a transformer 81. The three groups of panels A, B, C and D, and E and F are operatively connected to a control panel 83 located on the cellar wall close to the transformer 81 for Panel E and Panel F. Control Panel 84 for Panel G and Panel H is located with its corresponding transformer 81 on the cellar wall of the cellar space below Panel G and Panel H. Transformers 81 for Panel A and Panel B, and Panel C and Panel D are located in the basement on supporting columns 57. The thermostat 82 for each group of panels is located at conventional heights on a corresponding column 57 for controlling the temperature of the first floor working area within a predetermined temperature range.

Referring to FIGS. 33 and 34, there will be described the preferred connections to the Panel Wiring O—O for Panels A, C, D and E and the Panel Wiring O for Panels B, F, G and H. Referring to FIG. 33, the reinforcing rods 21 with the U-shaped connectors 22 formed into a series electrical grid circuit and operatively connected to terminal leads 85 which may be either No. 1 or two No. 6 wires for operatively connecting the Panel Wiring O—O to a 55 volt A.C. circuit for supplying the electrical energy for the electrical grid of Panel Wiring O—O. The electrical grid formed by the reinforcing rods and U-shaped connectors is divided into three parallel grid circuits by terminal leads 86 and 87 respectively connected at 86' and 87' as illustrated and to the respective terminal leads 85. It is within the scope of the invention that the location of these taps 86' and 87' may be changed to vary the heating output of the Panel Wiring O—O whenever desired and changing the heat output at different parts of the floor area to meet necessary changes in the amount of heat applied to different areas of the building.

Referring to FIG. 34, the Panel Wiring O provided by the reinforcing rods 21 and U-shaped connectors 22 which provide a series electrical grid circuit is suitably divided into two parallel grid circuits. The Panel Wiring O is connected to terminal leads 88 which may be either of No. 6 wire or No. 1 wire. In order to divide this electrical series grid circuit into two parallel grid circuits a terminal lead 89 is operatively connected to a tap 89' on one of the reinforcing rods as illustrated. To complete the parallel grid circuits, a lead 90 operatively connects the two terminal leads 88 to provide connections of the two parallel grid circuits to a 55 volt alternating current circuit which is operatively connected to a transformer for supplying the electrical energy for the electrical grid circuits of Panel Wiring O. Since the grid circuits as described with reference to FIGS. 33 and 34 are common with respect to the different Panel Wirings O—O and O for the various panels, further description is believed unnecessary.

It is also within the scope of the invention to include a temperature detector 39 for each group of two panels, making in this instance four in all, are operatively located with respect to one of the heating bars or reinforcing rods 21 for controlling the temperature of the heating bars preferably within a predetermined range of temperature as well as the floor temperature within a predetermined range for each group of pairs of panel wiring as previously outlined.

Referring to FIG. 25, there is illustrated an electric grid heating system 91 for the building driveway section 62. The electric grid heating system 91 preferably comprises four similar grids 92 formed from longitudinally extending heating bars or reinforcing rods 21 having the ends thereof operatively connected by U-shaped connectors 22 and turnbuckle type of connectors 23 as illustrated in FIG. 4 to provide a series electrical grid heating circuit. In this particular instance, the similar electrical heating grids have their terminal ends brought over to a common location 93 by four pairs of terminal leads 94, 95, 96 and 97. As illustrated at 98 and in the enlarged section thereof as illustrated in FIG. 26, each of the terminal leads 94, 95, 96 and 97 is bent upwardly at right angles forming terminal connections 99 for each of the respective terminal leads. Each of the terminal connections may be suitably formed as, for example, a threaded end 100 for connecting to suitable couplings of electric cables for connecting each of the grids 92 to a 55 volt A.C. transformer connection for supplying energy to the grids. It is within the scope of the invention that each of these grids may be separately connected to the terminals of a transformer wherein the grids are individual circuits or these grids may be operatively connected in parallel as two sets of grids or in any combination found desirable. In this particular instance, the terminal connections 99 are preferably connected to the transformer 81 for the grid circuits previously described with respect to Panel E and Panel F, FIG. 23.

Each of these grids 92 is preferably formed from substantially one-quarter inch steel reinforcing rods 21, each twenty-nine feet long and ten of these heating bars or reinforcing rods 21 spaced five inches apart to provide a grid width of three feet nine inches. Each of these grids 92 are spaced four inches apart so that the heating area substantially twenty-nine feet long by sixteen feet wide is provided for the driveway section 62. Since these heating rods were laid upon the concrete driveway, it was found preferable to fabricate the heating bars as straight rods rather than being suitably crimped as were the reinforcing bars for the floor panels of the building. If these heating bars had been originally used as reinforcing rods for the monolithic reinforced driveway section, these heating bars would have been crimped as will be described with reference to FIG. 29. A suitable "Tarvia" road-surfacing material was applied over the heating bars to form the finished surface of the driveway. The temperature of the bars was such when operating that this Tarvia material which has an asphalt base did not soften or melt. The couplings 23 for the connectors are suitably tightened and preferably formed from non-ferrous material to prevent hot spots forming at the coupling. Although it is preferred to make each of the rods of the required length, it is also within the scope of the invention that the rods may be of suitable length and coupled together to complete the desired length of rod for the heating panel whether for the driveway section or for any of the other panels of the floor heating system.

Although the heating system for the driveway has been described as being connected to the transformer for Panels E and F, it would also be within the scope of the invention that the driveway electric heating system could be suitably connected to the transformer 81 for the floor heating panels G and H. Although the heating bars have been described as being lengthwise with respect to the driveway, it is also within the scope of the invention that any other arrangement of the heating bars such as transversely positioned as to their present position would also be satisfactory.

Although the driveway electric heating system has been described as operatively connected to the transformer for a group of the floor panels, it is also within the scope of the invention that the driveway electric heating system might be suitably connected to its own transformer and controls therefor for operating the grids 92 within a predetermined range of temperature which would differ from the indoor building temperature because of the opening of the doors to the driveway section of the building for the entry of trucks to the loading platforms which obviously causes rapid changes in temperature in this area as compared with other sections of the building.

In order to orient the building construction with respect to the points of the compass, the building as illustrated FIGS. 10a and d, 10a has the side walls at the top of the sheets facing south and the side walls at the bottom of the sheets facing north. The longitudinal length of the building has the end wall of FIG. 10 facing the east and the end wall of FIG. 10a facing the west. The FIGS. 23 and 24 are drawn with respect to FIGS. 10 and 10a for one standing relatively with respect to the south side of the building, looking north. FIG. 25 is viewed by one standing at the north end of a driveway, looking toward the south.

Referring to FIGS. 2, 4, 27, 28 and 29, the particular sizes of the U-shaped connector for the different panels and the crimped reinforcing rod for the grid structure of the heating panels will now be described. Referring to FIGS. 2 and 4, the floor to reinforcing and/or heating bars 21, as well as the intermediate reinforcing bars are preferably spaced twelve and one-half inches apart. The diameter of the stock for the reinforcing bars, as well as the U-shaped connector, is preferably one-quarter inch diameter, steel reinforcing bars. The length of the ends of the U-shaped connector 22 is three inches and the lateral spacing of the legs is twelve and one-half inches corresponding to the spacing of the heating bar.

Referring to FIG. 27 and FIG. 34, the U-shaped connector 101 for the reinforcing rods to provide a series electrical grid circuit which have been identified in FIG. 34 as the U-shaped connectors 22, has the legs of the U-shaped connector spaced seven and one-half inches apart and the length of the legs three feet, six inches. The ends of the legs are threaded with left hand threads for substantially five-eighths of an inch as are all the U-shaped connectors to connect the U-shaped connectors to pairs of reinforcing rods 21 in a series electrical circuit with suitable turnbuckle couplings 23 provided with right and left hand threads. Panels B and F are substantially identical having been cut down in size because of the elevator openings. The spacings of the reinforcing rods 21 are also seven and one-half inches comparing to the spacing of the legs of the U-shaped connector 101. Since Panels B and F include twenty-one reinforcing rods, the length of each of these rods including the connecting ends of the U-shaped connector which is three feet six inches, making a total of twenty-seven feet overall in length, makes a total of five hundred and sixty-seven feet plus the length of the base of the U-shaped connector of 7.8 inches makes a total for the twenty connectors of thirteen feet or a total lineal length of the grid of five hundred and eighty feet.

Referring to FIGS. 28 and 34, the U-shaped connector 101' for Panels G and H has a spacing of the legs of 6.25 inches, the lengths of the legs being one foot, six inches and each leg having a five-eighths inch left hand thread. Panels G and H have twenty-eight heating bars and/or reinforcing rods twenty feet long which together with the length of the legs of one foot, six inches of the U-shaped connectors, make a total of six hundred and forty-four feet to which is added the length of the base of twenty-seven U-shaped connectors 6.25 inches in length making a total of fourteen feet, and therefore a total of six hundred and fifty-eight lineal feet for each grid Panel G and H.

Referring to FIG. 29, the reinforcing rods and/or heating bar 21 are preferably twenty feet in length having threaded ends formed with right hand threads through which are adapted to be coupled a turnbuckle coupling 23 having right and left hand threads. The preferred diameter of the heating bars 21 is one-quarter inch in diameter though other suitable diameter of reinforcing rod may be used depending upon the heating conditions and the loads which are carried by the heating panels. With a preferred spacing of from four inches to nine inches, loads of from two hundred and fifty pounds to over twelve hundred pounds per square foot of floor area reinforced by the reinforcing rods may be suitably carried. With reference to the electric grid heating system for the driveway section 62, the reinforcing rods of these grid constructions were described as being straight. However, where reinforcing is necessary, it is preferred to fabricate the reinforcing rods by suitably crimping to provide longitudinally extending undulating anchoring deformations integrally formed on the steel reinforcing rods, and wherein said deformations are displaced laterally within the range of substantially greater than the thickness of the reinforcing rods but less than twice the thickness thereof. Although it is preferred to form the heating bars and reinforcing rods twenty feet in length to have a standard length, it is also within the scope of the invention that one may have multiples of ten and they may be of any suitable length to correspond to the length of the area to be heated and reinforced by the same heating bar and/or reinforcing rod. The crimping provided by the undulation 102 proves the bonding strength between the reinforcing rods and the poured and set concrete within which the reinforcing rods are embedded.

Referring to FIGS. 13, 14, 15, 16 and 17 there will now be particularly described the method of setting the forms and laying the combined reinforcing rods and heating bars and apparatus for prestressing the reinforcing rods within a predetermined tensile strength of the reinforcing rods to provide prestressed monolithic reinforced concrete floor panels wherein the reinforcing serves as the reinforcing for the panels and floor loads supported by the floor panels but also provides the heating bars of the grids of the electric grid heating system for the building as has been particularly described above. FIG. 13 is a perspective view illustrating an enlarged portion of the form work 105 for placing the combined reinforcing rods and heating bars and prestressing them for pouring the reinforced monolithic floor heating Panel C which extends from the center reinforced concrete floor beam 73 to the side wall of the building. It is within the scope of the invention that a single Panel C may be poured at one time or, for example, both Panels C and D may be simultaneously poured at one time after the forms have been set up and the reinforcing rods positioned and prestressed. The reinforcing rods 21 which are preferably crimped with a plurality of undulations 102 are laid to extend across the precast concrete floor I-beams 71, the first preferably mounting plywood concrete-forming panels 106 or similar sheathing on hanger bars 107 (see FIG. 13). The concrete positioned by these panels embeds the combined reinforcing and heating means in the form of the plurality of reinforcing rods 21 operatively connected together in a suitable electric grid circuit. The undulating heating bars and reinforcing rods 21 are connected together a turnbuckle-type coupling to the U-shaped connector 22 as illustrated in FIG. 4. Referring to FIG. 13 because of the size of the rods 21 and couplings 23 therefor, they are not readily distinguishable from the rods themselves and have been illustrated out of proportion. However, in an enlarged view, as illustrated in FIG. 14, the U-shaped connectors 22 are illustrated as being connected to the reinforcing rods 21 by the couplings 23. Also as illustrated in FIG. 14, wherever it is believed advisable, the electrical jumpers 108 may be shunted about the couplings 23 so that if ferrous type of couplings 23 are used, hot spots will not occur at the juncture of the U-shaped connectors 22 and their respective heating rods 21 because of the coupling members 23. The electrical jumper 108 comprises a copper cable 109 of suitable cross section for carrying the expected current in the reinforcing rod and the cable is affixed across the respective coupling 23 by clamp bolts 110 and nuts 111. If non-ferrous couplings 23 are used preferably formed of copper or brass, the jumpers 108 are usually not necessary. After each series grid for the floor heating panel is assembled, if there is a source of electrical energy available, it is possible to test this electric series circuit of the reinforcing rods and U-shaped connectors and it may be determined where excessive heat may develop that certain of the turnbuckle couplings may be tightened if necessary, or if found desirable, they may be placed at points where hot spots appear to occur. It is thus obvious that it is very simple to position the reinforcing rods 21 and their U-shaped connectors to a suitable series electric grid circuit and the form work for pouring the concrete to form the reinforced monolithic floor panels provides a satisfactory form of scaffolding for positioning this electric grid heating circuit in position prior to the pouring of the concrete for the floor panels or other suitable concrete construction.

Referring to FIGS. 13, 15 and 16, there will be particularly described the structure for stressing the combined reinforcing rods and heating rods of an electric grid heating system to provide upon the pouring and setting of the concrete a prestressed reinforced monolithic reinforcing and heating panel. Vertically extending crank arms 112 are positioned as shown in FIGS. 13, 15 and 16 contiguous to the base of a U-shaped connector 22 and the legs thereof at each U-shaped connector for the opposite ends of the reinforcing rods as particularly illustrated in FIG. 13. As illustrated in FIGS. 15 and 16, the crank arms 112 for each pair of reinforcing rods are operatively mounted in holes 113 substantially along the center lines of the precast concrete I-beams 71 over which the base of the oppositely positioned U-shaped connectors 22 are located. The crank arms 112 are formed with crank portions 114 on which are positioned stringers 115 so that upon a force being applied to the oppositely positioned stringers 115, the reinforcing rods may be prestressed so that they are carried substantially in a straight line without any sagging, and said reinforcing rods are preferably prestressed within the range up to substantially fifty percent of the ultimate strength of the reinforcing rods. In order to apply the force necessary for prestressing the reinforcing rods, wires 116 are wound about the stringer 115 as illustrated in FIG. 13 and suitably twisted after being affixed to the bracing 117 for the concrete forms the wires 116 being suitably affixed by securing means 118. The wires 116 may be suitably twisted by insertion of a rod between the wires and twisting the wires until the necessary force has been applied within the limits set forth above. Although the force in this instance is applied by twisting wires, other suitable forms of means for applying the necessary force may be used through cables over suitable shives and weights. As viewed in FIGS. 15 and 16, the crank arm 112 serves as a lever for applying the force to the base of the U-shaped connectors, and the arrangement shown in FIGS. 13, 15 and 16 illustrates a very simple method of applying the necessary force to prestress the reinforcing rods uniformly throughout the reinforcement for the floor panels. When prestressed in this manner, the floor load per square foot of each of the reinforced concrete floor panels that may be supported by this construction varies within the range of from substantially two hundred and fifty pounds to twelve hundred pounds per square foot.

Referring to FIG. 14, the form work 105 for pouring the reinforced concrete floor panel described above including the plywood panels 106 are also supported from the spaced concrete I-beams by a joist 119 by U-shaped hangers 120, as illustrated in FIGS. 14 and 17. In this particular floor panel construction, the forms 105 are erected to pour a floor panel substantially five inches in thickness in which one and one-half inches of the thickness of the floor panel is positioned below the top face of the I-beam 71 and with three and one-half inches of concrete when poured, as shown in FIG. 17 above the reinforcing rods 21. In order to level off the floor surface, screed supports 121 as shown in FIGS. 13 and 17 are suitably mounted upon the panels 106 for supporting a T-shaped screed 122. After the concrete has been poured and set, the screed construction 122 and portions of the support therefor may be removed and the recesses left thereby suitably filled in. In order to provide additional support for the floor panels, concrete members 123 as shown in FIG. 17 may be poured to act as stiffeners for the I-beam 71 and are preferably positioned intermediate the length of the I-beam at predetermined locations, and in this particular embodiment there are preferably placed intermediate the length of spaced I-beams from between the side wall of the building and the center longitudinally extending reinforced concrete floor beam. The I-beams 71 are preferably fourteen inches in depth and spaced on two feet, four and three/eighth inch centers so that twelve concrete joists are used providing eleven spaces dimensioned as set forth above. The weight of these concrete joists is preferably 14.75 pounds per lineal foot. The concrete bridging 123 is preferably four inches in thickness and to the bottom of the I-beam 71 as illustrated in FIG. 17, and is spaced lengthwise of the concrete I-beam 71 so that for each length the concrete bridging 123 is spaced eight feet one inch from the center beam at side walls so that there are two concrete bridges 123 integrally affixed to the I-beam 71 and spaced on two feet five inch centers. The bridging 123 is formed by suitable spaced panels (not shown) extending between the I-beams 71 in conventional fashion, and by the lower panels 123a extending underneath the I-beams 71. These lower panels are suspended from the loops 123b shown in FIGURE 17.

In this preferred building construction, the floor panels are preferably five inches in thickness and the corresponding roof slabs are three and one-half inches in thickness. The height of the top face of the first floor is substantially eight feet above the top surface of the basement floor. The ceiling height of the roof above the first floor is substantially thirteen feet one and one-half inches and is within the ratio of substantially twenty cubic feet per square foot of floor area in which seven cubic feet is below the first floor and thirteen cubic feet per square foot of floor area is above the first floor so that approximately twenty-five percent of the heat emitted by the electric grid floor heating system goes to the cellar space and the balance is for use in heating the space of the first floor area. As was described above, the contiguous roof slabs are preferably separated by a suitable waterstop as described and which is an improvement on the aforementioned door stop as disclosed and claimed in the aforementioned U.S. Patent. There may be substituted therefor a labrynth waterstop or Keyway Waterseal as disclosed and claimed in my co-pending application Serial No. 385,969, filed Oct. 14, 1953. To provide a suitable expansion joint between contiguous floor panels and between the double column 58, a one-half inch by five inch expansion joint preferably formed from an asphalt impregnated fiber board may be used. If desired, the previous forms of waterseal and waterstops may also be used. Referring to FIGS. 13, 17 and 18, the resultant reinforced concrete floor panel will appear somewhat as illustrated in FIG. 18 with the reinforcing and heating bars 21 with their undulations 102 as illustrated. The preferable spacing between the reinforcing and heating bars 21 is within the range of from substantially four inches to nine inches depending upon the floor load and the watts per square foot to be dissipated. As illustrated in FIG. 17, the concrete is first poured, tamped and vibrated in place so that substantially one and one-half inches of concrete is positioned beneath the reinforcing rods 21 as they extend across the concrete I-beam 71 as they are prestressed with the apparatus as described with reference to FIG. 13. The remaining three and one-half inches of concrete is then poured and vibrated in place and screeded off to form the finished floor surface. It is also within the scope of the invention to position the heating and/or reinforcing bars 21 as described with reference to FIG. 3.

Referring to FIGS. 19 and 20, there is illustrated an electric grid heating system for a side wall of a building which may be heated from floor panels comprising the electric grid heating system as described above together with the electric grid heating system for a side wall of a building. These figures illustrate an enlarged portion of an end wall 11″ at its juncture with a side wall 11′. The concrete end wall 11″ has suitable furring strips 124 secured to the end wall and upon which is affixed expanded metal lathing 125. Upon the metal lathing 125 is placed a conventional plaster brown coat 126 upon which is erected an electric grid heating system for the peripheral wall surface similar to the grid system of the floor panels of the building as described above. The wall grid heating system comprises a plurality of longitudinally extending and vertically spaced heating bars 21 connected at their ends by the U-shaped connectors 22 to provide a series electrical grid heating circuit. Over this electric grid circuit is a scratch coat of plaster 126′ and a finished coat of plaster 127 to complete the ornamental wall surface. The electric wall grid heating system may be operatively connected to the electrical circuit of contiguous floor panels, if desired, or may have its own separate electrical circuit for energizing the electric grid wall heating system.

Referring to FIGS. 21 and 22, there is illustrated a floor grid heating system employing multiple electric grid heating circuits such as has been described with reference to FIGS. 13 and 14, for example. In this embodiment where it is desired to have a greater wattage dissipated per square foot of floor area, a lower electric grid heating system 128 is fabricated as described, for example, with reference to FIG. 13 and insulating members 129 are formed as shown in these figures and each of these insulating members 129 include a lower slotted portion 130 within which one of the reinforcing rods 21 of the lower grid system 128 is positioned, and the upper grid system 131 has certain of its reinforcing members 21 placed in a similar slot 130′ but transverse to the lower slot 130. The lower grid heating system 128 is suitably prestressed as described with reference to FIG. 13 and the concrete for embedding the lower grid heating system 128 is poured and vibrated in place and afterwards upon the setting of the insulating members 129, either prior to the pouring or during the pouring may be set in position for supporting the upper grid heating system, and after the upper grid heating system has been suitably prestressed as the lower grid heating system, the remainder of the concrete for the heating panel is then poured and vibrated in place and allowed to set.

The apparatus for prestressing the reinforcing rods of the electric grid heating system as described with reference to FIG. 13, which comprises the crank arms 112, after the concrete has reached its initial set or later as desired may then be detached since the reinforcing rods 21 will then become firmly affixed within the concrete in which they are embedded. Of these crank arms 112, they may be suitably removed by twisting and turning using the crank portions 114 but if it is desired to retain a positive support for the reinforcing rods, these may be cut off close to the top of the U-shaped connectors 22 and the remaining portion embedded within the concrete and affixed to the I-beam 71 may be allowed to remain in position.

Referring to FIGS. 9, 13, 18 and 21, for example, the temperature detector 39 may be positioned in place contiguous to one of the heating and reinforcing bars 21 prior to the pouring of the concrete for the floor panel or side wall panel as illustrated in FIG. 19, and then suitably embedded into position. If desirable, the temperature detector 39 may be located even after the floor panel has been poured and allowed to set or prior to the final setting of the concrete have the temperature detector 39 located contiguous to one of the heating bars 21 to suitably control the electric grid circuit so that the heating and reinforcing bars 21 do not rise above a predetermined maximum temperature which is preferably 100° F. The temperature detector 39 for each electric grid heating system for a group of floor panels is so operatively connected with the control system for the floor panels that if temperature rises above a predetermined temperature, the energy supplied to the electric grid heating system will be shut off and then will only come on when the temperature of the rod has been reduced, for example, to a predetermined lower temperature, and this predetermined lower temperature may be such as to maintain the temperature of the floor panel within a predetermined temperature to heat the space above and below the floor panel within a predetermined temperature range as controlled by a suitable room thermostat.

Referring to FIGS. 10, 10a, 23 and 24, the design considerations for the electric floor heating system as described with respect to the above-identified figures will be particularly described. The heating areas include six panels each twenty-seven feet by eighteen feet (Panels A, B, C, D, E, F), and two panels each twenty-three feet by eighteen feet (Panels G and H). The energy input for the heating panels is to be substantially twelve watts per square foot, and the grid voltage is preferably not to exceed fifty volts. The reinforcing rods and heating bars 21 are preferably formed from steel bars of high strength steel (C1020 or C1045) and the preferred sizes of rods are 0.325 inch in diameter with 0.0012 ohm resistance per lineal foot and 0.270 inch diameter rods with 0.00174 ohm resistance per foot. As previously described with respect to the design considerations for the embodiment described with reference to FIGS. 2 through 9, the resistance of a one-quarter inch diameter rod was considered as being 0.0035 ohm per foot. However, in the calculations which follow, the resistance of 0.0017 ohm per foot is used but in order to correct these calculations the resistance of 0.0035 ohm per foot should be substituted wherever the resistance 0.00174 ohm is used in the calculations. It is preferred that the spacings of the rods 21 shall not be less than four inches on centers in order to facilitate placing of the concrete and within a maximum of twelve and one-half inches through the maximum preferred spacing would be nine inches.

Two general plans were considered for the electrical circuits for the heating grids of this building. Plan I considers the use of 0.325 inch diameter rods in all panels except Panels G and H which the bar size 0.270 inch diameter must be used. Plan II calls for the use of 0.270 inch diameter bars in all panels. Referring to the above-identified figures, together with FIGS. 33 and 34, the general electrical layout will be briefly described. In either plan, each panel will contain two separate heating grids connected in parallel with an electrical potential of approximately one hundred and then divided by two to equal fifty-five volts. The potential to ground will vary from 27.5 to 55 volts. This voltage range is one within which the usual building codes are not concerned.

The entire system, consisting of eight panels, has been divided into two groups with four panels in each group. The groups would be operated separately by 220/110 volt 37.5 kva. transformers. The 110 volt side of the transformer will be split to provide the two 55 volt circuits necessary to energize the four panels in each group. A schematic diagram of the grid and connecting circuits for such an arrangement is shown in FIG. 8. The 37.5 kva. transformers would meet the building code in the area in which the building was erected for full-load amperes in single-phase circuits. However, in the actual circuit as installed the panels of the building were divided into four circuits of two panels each and operatively connected to a 10 kva. single-phase transformer in a circuit as will be described in connection with FIG. 31.

The heating grid layout under Plans I and II include the calculations for the grid lengths under these plans and using the resistances as identified above for the heating bars. From the calculations it will be noted that both size bars may be used with equal satisfaction though it is believed that the small diameter bars 0.27 inch would be more practical to use throughout and permit a better spacing on at least six panels. Panels B, F, G and H present somewhat of a problem in that the grid bar length and spacing in these panels should be adjusted to compensate for grid resistance lost due to removal of bars in open floor areas. For example, the floor opening in Panel B will effect a loss of approximately seventy feet of grid length or in the case of a 0.270" diameter bar, a resistance loss of 70×0.00174 which equals 0.122 ohm. This amount of drop in resistance will increase the grid amperage from 56 to 64 amperes and panel input wattage from 12.7 to 16.2 watts per square foot. In such cases it would be preferable then that the calculated grid length be held fixed and the spacing between all rods in the entire panel be adjusted accordingly. In practice this can be done readily by the use of carefully prepared scaled drawings of each panel. The common lead should be attached to preferably the exact center of the total grid bar length for an entire panel. However this point may or may not always be located at the center as shown. This may vary in Panels B, F, G and H. FIGS. 33 and 34 illustrate the various connections to the grids of the floor system as was previously described. The calculations which follow were calculated with full panel conditions only. These calculations would change somewhat in the final analysis when the floor openings are taken into account.

There follows the calculations for Plan I and Plan II. The computations for Plan I include Panels A, B, C, D, E and F using a 0.325 inch diameter rod, and for Panels G and H using 0.270 inch bars. The calculations for Plan II relate to Panels A, B, C, D, E and F using a rod size of 0.270 inch in diameter and Panels G and H also using a rod size of 0.270 inch in diameter. The calculations for both Panels G and H are the same with respect to Plan I and Plan II.

COMPUTATIONS FOR PLAN I

A. Panels A–B–C–D–E–F
  Heating area=27'×18'=486 sq. ft.
  Required power input=486×12=5832 watts Required power input per 1/2 panel=$\frac{5832}{2}$
  =2916 watts $\frac{\text{Rod } 0.325'' \text{ dia.}}{\text{voltage on grid}}$=Resistance=.0012 ohm/ft. 110/2=55 volts Consider minimum spacing of 4" for bars $\frac{216}{4}$=54 spaces and 55 full bars 55×27  =1485 lin. ft. for full bars
  54×4/12= 18 lin. ft. for connectors
          1503 Total lin. ft. for full panel $\frac{1503}{2}$×.0012 ohms=751.5×.0012=.9018 ohms $I=\frac{55}{.9018}$=61 amps. or 121 amps. full panel Power=$\frac{(55)^2}{.9018 \times 243}=\frac{3025}{219}$=13.8 watts/sq. ft.

Length of grid per ½ panel=751.5 lin. ft.

B. Panels G and H
  Use 0.270" bars at 4" spacing in accordance with calculations under Plan II.
  55 rods @23 ft.
  $I$=49.2 amps
  Power=13.1 watts
  Length of grid per ½ panel 641.5 ft.

COMPUTATIONS FOR PLAN II

A. Panels A–B–C–D–E–F
  Heating area=27'×18'=486 sq. ft.
  Required power input=min.–12 watts
  Required power input full panel=486×12=5832 watts Required power input 1/2 panel=$\frac{5832}{2}$=2916 watts Rod size=0.0270"—Resistance=.00174 ohms/ft.
  Voltage in grid=110/2=volts Resistance 1/2 panel=$\frac{552}{2916}$=1.035 ohms Rod needed=$\frac{1.035}{.00174}$=597 feet 597×2=1194—connectors for total panel $\frac{1194}{27}$=44+rods needed $\frac{18 \times 12}{43}$=4.9 spacing Use 41 rods @5.4" spacing full panel Rod length=41×27×=1107' for bars
      40× $\frac{5.4}{12}$=  18' connectors Total for panel $=1125\times.00174=1.96$ ohms $$1/2 \text{ panel}=\frac{1.96}{2}=.980 \text{ ohms}$$

$$\text{Amps.}=\frac{55}{.98}=56 \text{ or } 112 \text{ for full panel}$$

$$\text{Power input}=\frac{55^2}{.98\times 243}=\frac{3025}{238}=12.7 \text{ watts}$$

Length grid per ½ panel=562.5 lin. ft.

B. Panels G–H
  Heating area=23' x 18'=414 sq. ft.
  Required power input=414 x 12=4968 watts
  Rod size=0.270″ dia.—Res.=0.00174 ohms
  Voltage=110/2 or 55 volts $$\text{Resistance } 1/2 \text{ panel}=\frac{(55)^2}{\frac{4968}{2}}=\frac{3025}{2484}=1.218 \text{ ohms}$$

$\frac{1.218}{.00174}=700$ lin. ft. or 1400—Connectors per full panel $\frac{1400}{23}=60.8$ rods for full panel $\frac{216}{61}=3.54''$ spacing (too close)

Use 4 inch spacing, then $\frac{216}{4}=54$ spaces or 55 rods @ 23 ft.—connectors $55\times 23\times =1265'$ bars
$54\times \frac{4}{12} = \underline{\phantom{00}18'}$ connectors
$\phantom{54\times \frac{4}{12} =}1283 \times .00174=2.240$ ohms $1/2$ panel require $\frac{2240}{2}=1.120$ ohms $I=\frac{55}{1.120}=49.2$ amps. or 98.4 for full panel $\text{Power}=\frac{55^2}{(1.120)207}=\frac{3025}{232}=13.1$ watts Length of grid per ½ panel=641.5 lin. ft.

In the study set out above, wherein the plan proposed calls for one temperature control system for each group of panels, it was preferred that each temperature control system comprise the following electrical control units:

1. One—Honeywell Heavy Duty Line Voltage Room Thermostat, Model T42A range 40–80° F., 115 volts A.C., or equivalent, to control panels through air temperature.

2. Two—Honeywell Panel Temperature Control Units, Model T415A, range 60–100° F. differential scale setting of 1° F., 115 volts A.C., or equivalent. The two units would be connected in such a way to serve as a safety feature in case one unit should fail. This was described with reference to the circuit of FIG. 9.

As described with reference to FIG. 9, the capsule and tubing of the temperature detector 39 should be copper. The length of tubing should be at least 10 feet. Each of these capsules 39 should be insulated and placed next to a grid bar to control bar temperature as well as floor temperature.

3. The 2 pole contactor 31 as described with reference to FIG. 9 should be A.C.—115 volt, 135 amp. 2 pole contactor. General Electric Model CR2810–C24A2 or equal.

For special studies it is also within the scope of the invention that thermocouples may be installed on the heating grids and in the concrete floor slab to collect, from time to time, operation temperatures for the purpose of checking design calculations and to further increase the knowledge of the operation of the system in case of later installations.

With the above computations, utilizing high tensile, high carbon steel and with a rod diameter of 0.272 inch in diameter and a carbon content 1035 to 1045 indicates that at around 55 to 60 volts, the ideal length of grid is about 250 to 300 feet to control the rod temperature to around 100° to 120° F. This appears the ideal temperature for a floor slab. More or less heat can be used in the slab by varying the spacing of the grid. For example, in a country and under conditions where one would only require heat one month out of the year and at a total variation of 40° in temperature, bring it from 25° above zero to a room temperature of 65°, one would naturally require less heat. For this temperature range, one would use a wider spacing of the grid in the slabs than one would under conditions where a greater amount of heat would be necessary for a change of 75° in temperature, bringing it from 10° F. below zero to 65° F. above.

From the above conditions for this grid construction of this invention to provide the proper inch spacing in the grid this may be done by the formula wherein 360 is divided by the temperature variation to be effected, such as 60° F., would result in six inches for a double area that is being heated, such as a combination basement and first floor where there is had, for example, 7 cubic feet per square foot of basement below and 13 cubic foot of square foot of floor for a first floor area to be heated. This would be a total of 20 cubic feet per square foot of slab. Therefore, a 90° F. variation in temperature, the grid spacing would be four inches, and for a variation of 40° F. in temperature, the spacing of the heating rods would be 9″; etc. This same formula may be used for even different grid sizes where it is desirable to use a larger rod or even a smaller diameter heating rod.

The spacing used in this building construction varied from five inches to eight inches. For example, in an area where there were elevators in places in the floor, or stairways and the like, no grids were placed so that these places were only partially heated. In these panels, a closer spacing of reinforcing bars was had than where the grid covered the entire floor area. It is also within the scope of the invention that the spacing of the grid could have been varied throughout in areas requiring heavier floor loads, but even a spacing of seven to eight inches was considered sufficient enough to carry loads up to one thousand pounds per square foot of floor load. Loads of eight hundred pounds per square foot have been applied to the floors over sizeable areas without any dangerous deflection. It is, therefore, believed that for this electric grid heating system, the ideal size rod has been selected and most any normal conditions may be met as far as required floor loads are concerned. It is also believed that the grid heating system as described above is also satisfactory for the elimination of ice on airplane runways, bad ice conditions on military highways, as well as for heating various type structures that have concrete slabs.

Therefore, with this electric grid heating system it is possible to use either with a constant voltage and with various controls on the temperature of the grid, for example, the temperature of the slab and the thermostatic control of the air temperature and clocks to shut the grids on and off and regulate the heat. It is also within the scope of the invention that further regulation may be incorporated such as a voltage regulator. Thus, by regulating the voltage between 60 volts and 30 volts at various settings, the temperature in the grid may be reduced accordingly; thus, at 30 volts one would have one-half the heat that one would have at 60 volts.

It is obvious that there has been described an electric grid heating system for satisfactory use in permanent concrete structures of one or more stories having poured slabs, preferably a slab poured on precast concrete beams, although it could be applied to slabs poured on structural steel beams. In this case it would be necessary to support the electric grid structure by suitable insulation above the steel beams. Where the slab is between two stories there is substantially twenty-five percent heat loss that goes down and seventy-five percent which goes up. This works out most satisfactorily for two story buildings where there is a basement not subject to many openings and closing of doors. The electric grid heating system of this invention is also suitable for any concrete slabs poured on the ground that may be heated such as warehouses, ammunition dumps, airport runways and roadways subject to ice conditions. Although not altogether necessary, it is preferred that slabs poured on the ground be poured in building paper comprising aluminum foil to assist in reflecting the heat. This electric grid system would also be satisfactory for use in climates where there are large falls of snow and heavy ice conditions forming on the roofs of buildings without departing from the scope of the invention. This form of electric grid heating system where an entire floor of a building structure is radiant heated provides a very economical form of heat application since the greater the area of any heating system that is in radiation the more efficient it becomes in the elimination of cold spots and insures uniform heating.

Referring to FIGS. 30 and 26, there will be described a floor heating system for a machine shop substantially 120 feet long by 40 feet wide located in the western section of the United States, and wherein there is plenty of available electrical power from hydro-electric power stations. Referring to FIG. 30, the building has thirty grids 135 of which seventeen are illustrated, the remaining thirteen being symmetrically positioned as are of the thirteen grids to the right of the left four grids of FIG. 30. Each grid 135 comprises eight heating bars and/or reinforcing rods 21 with their U-shaped connectors 22 assembled as previously described. The reinforcing rods are substantially thirty-five feet long with a four and one-half inch spacing of the rods, the rod diameter being preferably 0.272″. The reinforcing rods 21 longitudinally extend with respect to the width of the building and the spacing between the rods extends lengthwise of the building. In all six transformers 136 are used of which three are illustrated and the grids 135 are connected in groups of five to the corresponding transformer therefor. The terminal leads for each of the grids are similar as described with reference to FIG. 26 and include the right angle terminal connections 99. Access terminals 137 may be operatively connected to the grid as illustrated to step up the heat if found necessary. These access terminals 137 are also similarly connected as are the terminal connections 99. When not in use they are suitably insulated and if necessary these access terminals may be readily connected to the respective grids in other locations than those as illustrated. The building as illustrated is divided into suitable areas by a wall construction 138. Each of the transformers 136 are connected to the five grids 135 in parallel to a 60 volt circuit of the transformer. Each of the transformers supplies 12½ kva. and has a 240–480 volts primary circuit and a 60–120 volts secondary circuit. The 60 volt secondary circuit is utilized for energizing the five grids of the electrical heating circuit to which the transformer is connected in parallel. For controlling each transformer and the circuit thereof, a line voltage thermostat operatively connected to a 240 volt coil of a combination circuit breaker and contactor panel which is operatively connected to the transformer for connecting the secondary circuit of the transformer to the grid circuit within the predetermined temperature range at which the thermostat is set. The rod temperature of each of these grids operates within the range of temperature from 90° to 100° F. It is preferred to use a high carbon reinforcing rod of S.A.E. 1035–1045 carbon content with brass couplings for connecting the U-shaped connectors 22 to the respective reinforcing rods to provide a series electrical grid circuit for each of the grids 135. It was also preferred to utilize straight reinforcing rods though it is within the scope of the invention that the crimped reinforcing rods, as previously described, may be used. In order to compare the effectiveness of crimped rods to straight rods, both types were used in this construction. With crimped rods, no cracks are formed in the floor of the building construction and therefore, to reduce cracking in any floor construction it would be preferred to use the crimped rods throughout the floor area.

Another electric grid heating system was installed in a wash house for a trailer court at the same location as the machine shop as described with reference to FIG. 30. This wash house was substantially square in shape and divided into thirds in which there were two grids in each third, making a total of six grids, the remaining third of the building was divided into three separate rooms. Each grid comprised ten reinforcing rods and all of six grids were connected in parallel to a 15 kva. transformer having a 230 volt primary circuit and a 55 volt secondary circuit. The 55 volt secondary circuit was connected in parallel to the six grids. A 24 volt two wire thermostat was connected to a 240 volt to 24 volt relay which in turn was connected to a size 3 magnetic starter having a 240 volt coil operatively connected to the primary circuit and the magnetic starter coil was controlled by a 100 amp. 240 volt fused switch. The amount of energy was from 13 to 14 kva. supplied to the grids when dry but was higher when the grids were operated in drying out the reinforced concrete floor panels. The size of the reinforcing rods was similar as that described with respect to the machine shop in FIG. 30.

Another electric grid heating system for a building sixty feet by forty feet is being installed on the west coast. The building was divided into four floor panels each having four grids making a total of sixteen grids in all. Each grid was formed from ten heating bars and/or reinforcing rods operatively connected in a series grid system. One of the grids for one of the panels was smaller than the other grid due to an eight foot by four foot hoist opening. The four grids of each panel were connected in parallel to a 12½ kva. transformer having a 240–480 volts primary circuit, and a 60–120 volts secondary circuit, the four grids being connected in parallel to the 60 volt secondary circuit. The transformer was operatively connected to a contactor and a 480 volt 60 amp. fused switch. For controlling the contactor there was used a 480–120 volt transformer which was operatively connected to a 120 volt—24 volt relay low voltage thermostat. The thermostat was placed upstairs whereas the transformer contactor fused switch and transformer for the thermostat were placed downstairs.

Referring to FIGS. 31, 32, 33 and 34, together with that of FIG. 10 and FIG. 10a, FIG. 23 and FIG. 24, there will be particularly described the basic wiring and switches for all panels including Panels A, C, D and E of FIG. 33, and Panels B, F, G and H of FIG. 34. Referring to FIGS. 31 and 32 a 3-pole, 600 volt line 140 is connected through a 3-pole disconnect switch 141 by suitable wiring 142 to an Allen Bradley size 1, magnetic motor starter 143. The magnetic starter 143 is connected to a transformer 144 through the wiring 145. The transformer 144 is an Acme transformer, type 330 35–8 sixty cycle and a primary voltage thereof is 480 with a two and one-half percent range. The transformer has suitable taps for the voltage required and this transformer supplies a secondary voltage of 55/110. The transformer is a single phase 10 kva. output. In this circuit, the primary is connected to the magnetic starter and the 55 volt taps are connected to the electric heating grid of one of the panels through suitable wiring 146. The transformer has A and B N.F.C. taps, and the transformer is for operation on a sixty cycle alternating current circuit. The primary winding 147 of a control transformer 148 is operatively connected to the line voltage by wiring 147' operatively connected to the wiring 142. The secondary winding 149 of the control transformer 148 supplies one hundred and ten volts for the operation of a relay 150 and also one hundred and ten volts for the operation of a clock motor 151. The relay 150 is connected to the secondary 149 of the control transformer 148 through a lead wire 152, and another lead wire 153 which has in its circuit a single pole switch 154 and a switch 155 operated by the clock motor 151. A common lead wire 156 connects one terminal of the clock motor and the switch 155 thereof to the other terminal of the secondary circuit 149. The other terminal of the clock motor 151 is connected to the secondary circuit 149 of the control transformer by a lead wire 157 at the same point of connection as the lead wire 152 of the relay. With this circuit, the electric circuit of the clock motor is always operating as long as the disconnect switch 141 is closed. As long as the single pole switch 154 and the switch 155 of the clock motor are closed, the secondary 149 of the transformer 148 is energized as is the primary circuit 158 of the relay 150. The secondary circuit 159 of the relay 150 operates at 24 volts and is connected to a temperature control 160 including a thermostat 161. Switches 162, 163 of the thermostat are in series therewith and in series with the secondary circuit 159 of the relay 150 through the wiring 164, and a time switch 166. The Tork time switch 166 includes a 125–250 volt single pole, single throw switch 167 rated at 35 amperes and the time switch also includes a 120 volt clock motor for 60 cycle A.C. operation.

The clock motor 151 and single pole, single throw switch 155 form part of the Sangamo time switch 168 which is a type L11. This Sangamo time switch includes the single pole, single throw 120–240 volt switch 155 rated at 35 amperes. The clock motor 151 thereof is for 120 volt, 60 cycle operation.

Referring to FIGS. 9 and 31, the temperature control with relay 37 of FIG. 9 is comparable to the temperature control 160 and relay 150 and the thermostat 161 of FIG. 31 is comparable to the room thermostat 46 of FIG. 9. The Tork time switch and the Sangamo time switch are of similar construction and may be interchanged one for the other.

The temperature control 160 is a Mercoid temperature controller S.P. No. DA-35 single pole for operation between 50° and 150° F.

Referring to FIG. 31, actuation of the magnetic starter 143 with the switches 167, 154 and 155 in their control position, the primary circuit 175 of the transformer 144 is energized from the 600 volt power line 140. Upon energization of the primary circuit 175, the secondary circuit 176 supplying the 55 volt circuit 146 which is connected to the grid circuit 20, for example, of FIG. 9 will be energized and this grid circuit 20 is illustrative of the grid circuits of pairs of panels to which the heating transformer 144 is operatively connected, the grid heating circuits for the panels being illustrated in FIGS. 10 and 10a, FIG. 23, FIG. 24, FIG. 33 and FIG. 34. The circuits of FIGS. 31 and 32 is also comparable to the basic wiring of the temperature detector, temperature control with relays and magnetic contactor of the wiring diagram of FIG. 6. Although the single throw switch 167 and time switch 166 have been described as being similar to the time switch 168, it is preferred that the member 166 shall be a 24 volt relay, energized by the secondary circuit 159, and that the switch 167 will also be controlled by a 110 volt relay actuated by the 110 volt coil 158. Similarly the coils of the relay switches 171 are operated from a 110 volt circuit. Therefore, upon energization of the 110 volt—24 volt relay 150 the thermostat circuit is controlled and also the 110 volt coils of the contactors are energized so that the heating transformer 144 is connected to its source of electrical energy.

Referring to FIG. 31 and FIG. 32 which illustrated the basic wiring and switches for the electrical heating panels, and also to FIGS. 39 and 40 which illustrate the wiring diagram and controls therefor for three heating transformer circuits. Basically FIGS. 31 and 32 may be considered as being the wiring diagram for Panels G and H of FIGS. 10 and 10a although likewise it may be considered as a basic wire diagram of Panels A and B, Panels C and D, and Panels E and F, each group of two panels being connected to its respective heating transformer 144. In FIGS. 39 and 40, like reference characters and similar reference characters indicate the same circuits and elements thereof as described with reference to FIGS. 31 and 32. FIG. 39 shows the three heating transformers 144 being operatively connected to their respective magnetic starters 143 and the wiring therefor as described with reference to FIGS. 31 and 32. Since there are three 24 to 110 volt relays operatively connected to the 150 watt transformer 148, the common wiring 152 has been illustrated as being connected to a common wire 152'. Similarly, the common wiring 156 operatively connected to the clock motor 151 of the time switches 168 have a common lead wire 156' to which the lead wires 156 of each time switch are operatively connected. A common lead wire 153' operatively connects the switch 155 of each of the time switches to their respective single pole switches 154. In the 150 watt control transformer 148, a two ampere fuse 148' is operatively mounted. The sixty ampere 600 volt disconnect switch has no fuses. FIG. 39 has printed thereon the number and sizes of the wires for the different circuits. It is believed that this is sufficient for one skilled in the art and need not be specifically described with reference to each lead wire. The magnetic switches 143 have 23 ampere heaters. Referring to FIG. 40, which illustrates in block form the various controls, heating transformer and switches therefor for a plurality of transformers operatively connected to a single control panel, the heating transformers identified by the reference character 144 correspond to the three heating transformers 81 identified with respect to FIGS. 23 and 24. The control panel as described with reference to FIG. 40, including the relay 150, the magnetic switches 143, the disconnect switch 141, the control transformer 148, the Boss fuse holder 148', time clocks 168 and single pole switches 154 correspond to the control panel 83 for the three pairs of electric grid circuits identified by Panels A and B, Panels C and D, and Panels E and F. FIG. 40 illustrates schematically the location of the respective parts of the control panel and the size of the conduit and the number and size of the wires of the various circuits. It is believed that FIG. 40, together with FIG. 39, is self explanatory when compared to the basic circuit described with reference to FIGS. 31 and 32. Referring to FIG. 32 and FIG. 39 and also FIG. 31, the heat control of FIG. 39 will not only include the thermostat 161 for the control of the room temperature but also the temperature control 160 as described with reference to FIG. 31 and FIG. 32 if found necessary. Referring to the basic wiring and switches for wall panels as described with reference to FIG. 31 and FIG. 32, FIG. 32 is illustrative of the control panel 84 for the pair of grids identified by Panels G and H, and this control panel 84 would include a relay 150, a control transformer 148, magnetic starter 143, a time switch 168 and a disconnect switch 141. In the circuits as described with reference to FIG. 31, FIG. 32 the thermostat 163 for the control of the circuit for each pair of panels is located in the first floor area at a suitable height above the floor panels which are controlled by the thermostat. The temperature detector 39 is operatively mounted as described previously contiguous to one of the heating rods 21 of the pair of electric grid circuits to which it is to control, and in turn is operatively connected to the temperature control 37 as identified in FIG. 9 and also identified as temperature control 160 in FIG. 31. It is believed that there has been described a simple control panel and wiring for controlling the energy supplied to the heating grids of a panel system of a floor heating system and also a control panel for the multiple control of a plurality of transformers for heating a plurality of pairs of electric grids of an electric floor heating system.

Although it is preferred to connect the heating transformers and control circuit therefor, as described with reference to FIGS. 31 and 32 and FIGS. 39 and 40, it is also within the scope of the invention, for example, in the building described to connect the panels thereof which are eight in number in two sets of panels of four each to a heating transformer, for example, of 37.5 kva. rating. If such a circuit was used, for example, Panels A and B including the grids thereof would have the respective grids of each panel connected in parallel and the two groups of panels also connected in parallel to a common ground similarly also Panels C and D and the grids thereof. The other circuit would include a similar heating circuit in which Panels E and F and the grids thereof would be connected in parallel and the panels also connected in parallel as would be the similar Panels G and H and the respective parallel grids thereof. The 37.5 kva. heating transformer would be operatively connected to a circuit breaker as described and the control circuit would include a temperature controller with relay operatively connected to temperature detectors and to a room thermostat, and the relay of the temperature controller operatively connected to the magnetic starter switch for operatively connecting the heating transformer to each pair of panels. Each pair of panels in this circuit would include a temperature controller with relay, temperature detector and the respective magnetic starter therefor positioned between the circuit breaker and the grid circuits of the panels to which the magnetic starter is operatively connected.

Referring to FIGS. 36, 37 and 38, there is illustrated the demand registration data for thirty-six hours of three typical months during the experimental operation of the electric grid heating system as described with respect to the electric circuits of FIGS. 31 and 39 for the grids of the floor heating panels illustrated in FIGS. 10 and 10a. Each of these FIGS. 36, 37 and 38 are for thirty-six hours from twelve noon to twelve night of the following day for comparable days of each of the months in which the demand registration data was taken. In this month of operation, as illustrated in FIG. 36, the power supplied experimentally for the operation of the electric grid heating circuit and for the operation of the equipment in the building did not exceed the maximum demand. Referring to FIG. 37, apparently the demand was within the prescribed limits. Referring to FIG. 38, the maximum kw was 160 and the peak kw. for billing on the chart reading was 53. As the constant was 160 in both the maximum and peak for billing, the demand was 85 kw. As to the kilowatt hour data, the present index was 0852 and as the previous index was 0600, the difference was 252 and with a constant of 160, the total kilowatt hours was 40820. From the data corresponding to the months illustrated in part by FIG. 37, a calculated rate was 1.34¢ per kilowatt hour, whereas the rate using the data furnished from FIG. 38 throughout the entire month was 1.7¢ per kilowatt hour.

From FIGS. 36, 37 and 38 it is obvious that the time clocks for each pair of control panels may be set for a predetermined period of operation during the off-peak load of the source of electrical power supplied by a power company so that the cost of heating may be reduced to a minimum. Likewise, it is also possible to set the operation of the time clocks within a predetermined period so that the panels are heated within the off-peak period of the equipment used in manufacturing in the particular building in which the heating system has been installed. By so operating the electric grid heating system it is possible to obtain maximum heating at a minimum cost and with a minimum cost for the kilowatt hours supplied on a demand basis. With the particular electric grid heating circuit described the panels may be operated within the same periods of operation or for different periods of operation depending upon the need for heat to the particular areas of the building in which the grid heating system is installed.

With respect to the electric grid heating system of my invention, it is equally satisfactory for the sizes of installation as described of a few thousand square feet up to and including buildings of one or several hundred thousand square feet of area. When the current supply to the electric grid heating system of a floor heating system is turned off, the stored heat continues to warm the building in the particular building construction described for about four hours. This is not sufficient when opening and closing doors where loading and unloading takes place. Therefore, with the electric heating system described it is possible to supply electrical energy to the grid system of the floor heating system within predetermined periods of time and within predetermined ranges of temperature in which the control is subject to the variation in temperature of the space above the floor heating system and also may be controlled by the temperature of the floor area in which the grids are mounted. Although this electric grid heating system may be suitably controlled not only by room thermostats but by the use of outside thermostats, in mountainous areas of warm days and cold nights this is not practical since one would heat the building when heat was not required. The clock control with inside thermostat is better since, in other words, there is no object in storing up heat on cold nights if the day itself is not cold enough to require the heat. However, the floor panels when heated by the electric grids of the electric floor heating system described will act as heat accumulators and will dissipate the heat supplied at a predetermined rate governed by the rate at which electrical energy is applied to the grids of the heating panels, and will also dissipate the heat to the space above and below the floor panels at a rate governed by the range of temperature of the heating bars of the electric grid heating system and also the range of temperature of the floor area.

It is also within the scope of this invention that if desirable, the perimeter of the floor area contiguous to the building walls may be suitably heated if in certain regions there might be moisture and condensation on the walls. This moisture and condensation might be present and may also be overcome where the heat is circulated or additional heat is used near the walls. However, with this electric grid floor heating system, this apparently did not occur as there was no condensation of the walls except for approximately sixty days until the concrete dried out which would be natural with almost any heating system. Once the concrete became normally dry, the additional moisture to which the building was subjected from the outside, such as during rainy seasons did not cause any moisture to come through the walls and condense. If circulation of air is desired, for example, in an office or in a working area of a factory, conventional air circulators may be used in connection with conventional forms of humidifiers. The electric grid heating system of this invention would also be adaptable for use with a heat pump system if found necessary. However, if heat transfer is desired in connection with using this electrical grid stored heat, the transfer should be a slow transfer of heat because this system has a comparatively slow build-up of heat and any rapid transfer of air would possibly defeat the efficiency of the system.

With this electric grid floor heating system, it is obvious that the heating of the floor slab is rather efficient. Once the concrete has been heated which is a form of stone such as the old fashioned foot warmers, it dissipates its heat very slowly. This is especially important in commercial buildings especially buildings used for manufacturing where trucks are loading in and out, because the heat does not pass out immediately as in the case of normal heating units. The normal heat is dispersed in the air and very little is absorbed into the building which would be retained when the air has changed. One advantage of this type of heating is that by placing the heat in the floor slab, approximately twenty-five percent of the heat will go into the area below provided it is not the ground. If it is on the ground, it is preferable to use aluminum or other types of reflectors to reflect the heat upwardly. Even though using the heating on the ground that even if heat is lost in the ground with this system, the heat loss is temporary as after the ground has warmed there is very little heat loss thereafter. In the case of the basement area being heated under the slab, the twenty-five percent of the heat that goes into the basement area would be sufficient to heat such a basement area usually as a basement has very few if any openings that normally create a change of air.

When the electric grid floor heating system of this invention is compared to a radiant heating system of using copper tubing and hot water to heat a slab, the biggest disadvantage is that the normal expansion and contraction in which the copper tubing is positioned has a tendency to crack the slab. Even if control joints are used where the copper tubing runs through the control joints, the expansion and contraction is very likely to break the tubing. By using the electrical grid of this system, it is very simple to eliminate any reinforcing going through the control joints or expansion joints and there will be none of the disadvantages experienced with the hot water radiant heating system. Also when it is necessary to bolt down machinery or otherwise break into the slabs, there is no danger of cutting into copper tubing having a leak to repair. Another advantage of this electric grid floor heating system is that the electrical grid heating system is merely a substitute for the reinforcing at a very little if any additional cost, whereas the copper tubing is entirely in addition to the regular reinforcing. There is also a saving with this electrical grid heating system over the hot water heating systems in the cost of the boiler and chimney which is not used in this electric grid heating system. Also with this electric grid heating system there is no special handling of the concrete or form work necessary. In this particular electric grid heating system, precast beams of concrete were used but it would also be possible to use structural steel beams with a slight additional cost for providing insulation between the electric grids and the steel beam construction. This can be done either by raising the grid rods, separating them from the steel beams or by blocking them up an inch or so from the steel beam to insure enough concrete between the steel beams and the electric grids to act as insulation.

Referring to FIG. 35 there is illustrated a modified form of heating means and reinforcing means 180 which may be used for reinforcing and heating a monolithic concrete floor panel or monolithic concrete slab. In this embodiment, the series electric grid circuit is formed by steel grids 21' similarly positioned as are the heating and reinforcing rods 21 of the preferred form of reinforcing and electric grid heating system as previously described with reference to FIGS. 2 and 4. The reinforcing and heating means 21' are available forms of expanded-metal reinforcing grids. For example, the mesh size may be No. 13 gauge having one and one-half inch by three inch steel grids. Other suitable forms of mesh grid may be used such as wire mesh fabricated from steel wire of suitable gauge but wherein the mesh formed by the wires is preferably welded at the juncture of the transverse and longitudinally extending wires forming the mesh. To provide the connections for the mesh grids 21' into a series electrical circuit, the ends of the grids are welded or brazed to a channel member 181. The channel members 181 may be formed from steel corresponding to the carbon content of the reinforcing mesh 21' or may be formed from non-ferrous material such as copper and the like which may be suitably brazed to the mesh. A threaded stud 182 may be suitably welded or otherwise affixed integrally with the channel member 181 to which the turnbuckle-type couplings 23 affix the U-shaped connectors 22. With the reinforcing rods 21 as described with reference to FIGS. 2 and 4, the preferred spacing is from four to twelve and one-half inches. However, with this form of reinforcing mesh 21', the preferred spacing is preferably that of the size of the reinforcing mesh commercially available. Therefore, it is preferred to make the widths of the reinforcing mesh 21' that as available in fabricating and the length of the panels may be any size required to suitably reinforce the concrete slab or floor panel in which it is embedded. However, it would be within the scope of the invention that the sheets of the reinforcing mesh could be suitably slit for any required center spacing of the reinforcing mesh 21' desired. The reinforcing mesh 21' therefore provides a mesh electrical circuit to provide a series electrical heating circuit as described with reference to FIG. 2, for example. Such a series electrical circuit may then be suitably divided into parallel circuits as thought necessary to dissipate the required heat as generated within the circuits formed by the reinforcing mesh. This combined reinforcing mesh and electric grid circuit lends itself preferably to smaller sectional areas due to the use of the expanded metal grid. With this construction it would be objectionable for use as a reinforcing in any other than a slab laid on the ground. Even when it is used in a ground slab, the reinforcing not being continuous will cause the floor to crack between the grid areas, whereas the preferred form of reinforcing formed by reinforcing rods either straight or crimped will give a continuous reinforcing of any length of floor area desired, whereas the expanded mesh will not. The preferred form of electric grid system formed by reinforcing rods is also simpler to install and cheaper to use. However, the mesh system of FIG. 5 as is the case with the preferred form of reinforcing rod electric grid heating system when properly installed if installed on the ground will serve accumulate in the concrete and in the ground below and when energy is not supplied to the heating systems of this type, the accumulated heat serves to warm the space above the concrete slabs or floor heating panels in which the electric grid heating systems are installed. With this mesh system as with the preferred form using reinforcing rods, the relative sensitivity of the heating system may be varied depending upon the depth at which the reinforcing mesh or reinforcing rods are installed. The system of FIG. 35 is equally adapted for off-peak power use whether of the off-peak periods of the source of the power or the off-peak periods of the plant in which these particular heating systems are employed. This construction is also equally adaptable for construction of floor slabs which are necessary to be reinforced from four to six inches. Similarly if greater reinforcing is required for larger amounts of heat required, the mesh system of FIG. 35 may be erected in which the mesh systems are transverse with respect to one another as was described with reference to FIG. 21. It is also possible with the heating system of FIG. 35 to prestress the mesh reinforcing in the same manner as was done with the installation of the reinforcing rods of the preferred form of electric grid heating system. Whereas it was pointed out that the preferred form of electric grid heating system formed by reinforcing rods will tend not to crack, cracks will form between the edges of contiguous mesh grids in all probability. As with the preferred form of electric grid heating system, the electric grid construction of FIG. 35 may be used with an operational voltage of 55 volts supplied from suitable transformers though this type of system lends itself for voltages within the range of from 16 to 60 volts preferably. Although both systems have been described for use with alternating current it is also within the scope of the invention that when available a suitable source of direct current within the prescribed voltage limits is equally satisfactory.

It is obvious from the above description with respect to a building construction and electric grid heating system therefor that there has been disclosed an improved building construction wherein control joints were used that completely isolated sections of the building from each other in the sense that no reinforcing steel connected the units through the control joints. Instead, dowels were used at a 30° angle in tension to tie the building together at these joints and in such a manner that the joint is flexible enough to take care of any necessary expansion and contraction due to exterior temperature conditions as well as the interior temperature conditions due to the floor panels being used for heating the building. This improved form of control joint so improved the efficiency of the control joints to the extent that no other cracks should develop in the building outside of the control joints. In connection with the building control joints, rubber control joints as described were used on the sides and first floor and the waterstop on the roof slab.

The poured concrete roof of this building construction was left plain and without the usual built-up roofing that is considered necessary to waterproof a concrete poured slab. The reason for this was that by the use of proper control joints and waterstops, the roof would not crack at other places. As long as the concrete does not crack, it may be easily waterproofed to the extent necessary by using a silicone solution.

The novel system of heating as described with reference to the floor panels of this improved building construction described a preferred form of heating system wherein the reinforcing steel in the slab was formed into an electric grid and used to heat the building. With this improved form of heating system, the heat delivered to the basement was approximately twenty-five percent, whereas the remaining seventy-five percent was used to heat the first floor area.

The electric grid construction was also the only reinforcing used in the floor other than what was in the precast beams and center poured beams of the building construction. Whereas, with the reinforcing described the expected floor load to be carried was two hundred and fifty pounds per square foot, it was actually possible to load the floor to over twelve hundred pounds per square foot in an area of aproximately one-third of the floor space. This obviously was a severe test for the use of this electric grid heating system as a suitable reinforcing for floor slabs of a building or other construction. The value of this grid system for reinforcing although primarily due to the steel being a very high tensile strength steel, by crimping the reinforcing rods as preferred the resulting reinforcing has a higher bond value in the concrete, greater than is normally had with a high bond reinforcing steel, particularly when the steel was prestressed. This was not done in the sense of what is ordinarily considered as prestressing by straining it to approximately fifty percent of its ultimate strength though this may be done but it was prestressed to the point where the steel was carried in a straight line without any sagging of any kind.

With the electric grid heating system of this invention it was possible to heat the building as it was being built at a time when the temperatures encountered were as much as 10° F. below zero. As a result, the slab was in a very cold condition, even though preventive measures had been used to try to keep the concrete from freezing. At periods, the slab temperature was not more than 2° or 30° F., above freezing when the electricity was turned on in the grids. Therefore, it is evident that with this construction it would be possible to pour concrete safely in cold regions heating the concrete as it set with a suitable electric grid heating system which would also be the reinforcing for the slabs being poured. With this type of system, it would therefore be possible to cure concrete within a range of temperature which would not effect the resultant strength of concrete, if the temperature of the concrete being cured in this manner could not rise above 73° F. though it would be possible to cure the concrete even up to temperatures of 120° F., but with a resulting loss of strength of the cured concrete.

In this particular building construction, while the concrete was curing, the building was maintained at a temperature of 60° F. which is sufficient for a person working in the area since when one person's body is in contact with the floor being heated at 60° F., this was equivalent to substantially 70° F. of any circulating type of heat. Although the floor slab of this building could have been heated more and the heat raised, this was not done as at the early stages of the concrete setting, it would have weakened the final strength of the concrete. The temperature in these rods of the electric grid heating system was about 100° F., but the floor temperature of the floor panels did not exceed 65° F., which was not sufficiently high to damage the setting of the concrete, especially if this temperature does not rise above 73° F. which is the maximum temperature at which concrete may be successfully cured without reducing its compressive strength. Although it is possible to cure concrete at higher temperatures up to 120° F., and which they have for short periods a higher compressive strength than concrete cured at 73° F., nevertheless over a longer period the resultant compressive strength is less than if cured at the perferred maximum of 73° F. or less.

It is also obvious with the heating system that the heat supplied may be increased by simple changes. For example, in the machine shop of FIG. 10, having heating panels G and H, it has been possible to double the heat by connecting the grids at the two-thirds point. In other words, the energy for each grid may be increased from 2½ to 4 kilowatts by this simple procedure. Whereas, previously three hundred and forty feet of heating rods furnished 2½ kilowatts, now two hundred and twenty feet of heating rods furnished 4 kilowatts. This, however, necessitated doubling the transformer rating from the original 10 kva. transformer, which was easily done by substituting a larger transformer, the original wiring being sufficient to carry the increased load. With the increased load, the 90° F. temperature of the rods was increased to 135° F., so that with the floor temperature being 55° F., previously; the temperature was raised to within the range of from substantially 65° F.–70° F. The remainder of the plant may have the heat increased in the same manner. As described with reference to later installations, this change is simplified with the original installation of access taps.

Having thus described my invention, it is obvious that various immaterial modifications may be made in the same without departing from the spirit of my invention; since, I do not wish to be understood as limiting myself to the exact arrangement and method herein shown and described, or uses mentioned.

What I claim as new and desire to secure by Letters Patent is:

1. An electric grid floor heating system for a reinforced concrete floor construction, comprising:
    reinforcing means,
        said reinforcing means including a plurality of longitudinally extending and laterally spaced steel reinforcing rods;
    U-shaped connectors for operatively connecting contiguous ends of the reinforcing rods in a series electrical circuit of the reinforcing rods;
    coupling means having threaded interengagement with said connectors and reinforcing rods for connecting the U-shaped connectors to the reinforcing rods at the ends thereof; and high-conductivity jumpers operatively connected in parallel with certain of said coupling means, whereby current through said coupling means is reduced to prevent localized generation of excessively heat, said reinforcing rods, U-shaped connectors, and coupling means being integrally embedded within concrete, providing a reinforced concrete floor construction.

2. An electrical heating system, comprising:

a plurality of prestressed undulating rods of material having relatively high strength and electrical resistance;

at least one U-shaped connector having the ends thereof disposed opposite the adjacent ends of certain of said rods, respectively;

turnbuckle members having threaded engagement with each of said rod ends and the connector ends opposite thereto, respectively, said threaded engagement with said rods being of opposite hand to that with said connectors;

concrete material cast about said rods;

said rods being disposed in said concrete material to function as a reinforcement; and electrical circuit means adapted to produce a flow of electrical current in said rods and connectors.

3. An electrical heating system, comprising:

a plurality of rods of material having relatively high strength and electrical resistance;

at least one U-shaped connector having the ends thereof disposed opposite the adjacent ends of certain of said rods, respectively;

turnbuckle members of material having relatively low electrical resistance and having threaded engagement with each of said rod ends and the connector ends opposite thereto, respectively, said threaded engagement with said rods being of opposite hand to that with said connectors;

concrete material cast about said rods, connectors, and turnbuckle members; and electrical circuit means adapted to produce a flow of electrical current in said rods and connectors.

References Cited by the Examiner

UNITED STATES PATENTS

| | | | |
|---|---|---|---|
| 455,687 | 7/1891 | McCarthy | 50—130 |
| 477,951 | 6/1892 | Mezger | 174—87 X |
| 588,435 | 8/1897 | Hunter | 339—276 |
| 767,582 | 8/1904 | Lewman | 50—138 X |
| 836,930 | 11/1906 | Cammann | 50—524 X |
| 1,098,436 | 6/1914 | Hadaway | 219—213 |
| 1,349,136 | 8/1920 | Lillard | 219—213 |
| 1,555,542 | 9/1925 | Young | 13—35 |
| 1,570,162 | 1/1926 | McKeehan et al. | 219—213 |
| 1,589,716 | 6/1926 | Peters | 50—138 |
| 1,640,468 | 8/1927 | Reynor | 50—138 X |
| 1,742,159 | 12/1929 | Hynes | 219—213 |
| 1,794,425 | 3/1931 | Sorensen | 50—136 |
| 1,818,254 | 8/1931 | Hewett | 50—129 |
| 1,851,125 | 3/1932 | MacMillan | 50—140 |
| 1,891,595 | 12/1932 | Grierson | 219—345 |
| 2,018,293 | 10/1935 | Williams et al. | 219—213 |
| 2,042,742 | 6/1936 | Taylor | 219—213 |
| 2,065,760 | 12/1936 | Smith | 219—376 |
| 2,068,639 | 1/1937 | Alsaker | 339—275 |
| 2,138,217 | 11/1938 | Sutter | 219—345 |
| 2,148,661 | 2/1939 | Thierer | 128—24.2 |
| 2,165,970 | 7/1939 | Jaspers | 219—345 X |
| 2,204,583 | 6/1940 | Falls | 50—263 |
| 2,228,052 | 1/1941 | Gardner | 50—346 |
| 2,314,766 | 3/1943 | Bull et al | 219—213 |
| 2,315,894 | 4/1943 | Crom | 50—129 |
| 2,319,105 | 5/1943 | Billner | 264—27 |
| 2,401,799 | 6/1946 | Riemenschneider et al. 339—222 X |
| 2,429,526 | 10/1947 | Savon | 339—222 X |
| 2,503,600 | 4/1950 | Tice | 219—213 |
| 2,503,601 | 4/1950 | Tice | 219—213 |
| 2,533,409 | 12/1950 | Tice | 219—213 |
| 2,540,465 | 2/1951 | Tice | 219—213 |
| 2,592,634 | 4/1952 | Wilson | 50—128 X |
| 2,611,943 | 9/1952 | Templeton | 50—138 X |
| 2,616,282 | 11/1952 | Vogel | 217—109 |
| 2,664,740 | 1/1954 | Cochrane | 50—441 |
| 2,683,916 | 7/1954 | Kelly | 264—27 |
| 2,695,513 | 11/1954 | Williams | 50—434 |
| 2,698,893 | 1/1955 | Ballard | 219—217 |
| 2,716,864 | 9/1955 | Hacker | 50—129 X |
| 2,727,293 | 12/1955 | Barnett et al. | 50—103 X |
| 2,786,349 | 3/1957 | Coff | 50—128 |
| 2,787,694 | 8/1957 | Farries | 219—202 |
| 2,802,091 | 8/1957 | MacKendrick | 219—529 |
| 2,825,115 | 3/1958 | Williams | 25—131 |
| 2,827,770 | 3/1958 | Bakker | 50—128 X |
| 2,859,504 | 11/1958 | Crowley | 264—228 |
| 2,876,326 | 3/1959 | Akmentin | 219—213 |
| 2,885,461 | 5/1959 | Cafiero | 339—222 X |
| 3,007,284 | 11/1961 | Dorland | 50—524 X |

FOREIGN PATENTS

| | | |
|---|---|---|
| 113,192 | 5/1941 | Australia. |
| 537,029 | 2/1922 | France. |
| 976,276 | 3/1951 | France. |
| 238,024 | 8/1925 | Great Britain. |
| 309,093 | 4/1929 | Great Britain. |
| 534,700 | 7/1943 | Great Britain. |
| 84,869 | 5/1920 | Switzerland. |

OTHER REFERENCES

Articles of "Roads and Streets," December 1943, pages 45–47.

Jonelis et al.: "Electric Light and Power Industry Report Issue," May 1, 1957, pages 38–41.

RICHARD M. WOOD, *Primary Examiner.*

MAX L. LEVY, *Examiner.*